United States Patent
Tanaka

(10) Patent No.: US 10,641,789 B2
(45) Date of Patent: May 5, 2020

(54) PHYSICAL QUANTITY SENSOR, PHYSICAL QUANTITY SENSOR DEVICE, ELECTRONIC EQUIPMENT, AND MOVING BODY

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/723,726

(22) Filed: Oct. 3, 2017

(65) Prior Publication Data

US 2018/0038888 A1  Feb. 8, 2018

Related U.S. Application Data

(62) Division of application No. 14/822,041, filed on Aug. 10, 2015, now Pat. No. 9,810,712.

(30) Foreign Application Priority Data

Aug. 15, 2014 (JP) ................................. 2014-165431
Aug. 19, 2014 (JP) ................................. 2014-166926
Aug. 19, 2014 (JP) ................................. 2014-166927
Jun. 5, 2015 (JP) ................................. 2015-114928

(51) Int. Cl.
    *G01P 15/125* (2006.01)
    *G01C 19/5755* (2012.01)
    *G01C 19/5769* (2012.01)
    *G01P 15/08* (2006.01)

(52) U.S. Cl.
    CPC ........ *G01P 15/125* (2013.01); *G01C 19/5755* (2013.01); *G01C 19/5769* (2013.01); *G01P 2015/0831* (2013.01)

(58) Field of Classification Search
    CPC ....................... G01P 15/125; G01P 2015/0831
    See application file for complete search history.

(56) References Cited

U.S. PATENT DOCUMENTS

| | | | |
|---|---|---|---|
| 5,388,460 A | 2/1995 | Sakurai et al. | |
| 5,488,864 A | 2/1996 | Stephan | |
| 5,581,035 A * | 12/1996 | Greiff | G01P 15/0802 324/688 |

(Continued)

FOREIGN PATENT DOCUMENTS

| DE | 102008043790 A1 | 5/2010 |
|---|---|---|
| JP | 04-299267 A | 10/1992 |

(Continued)

*Primary Examiner* — John E Chapman, Jr.
(74) *Attorney, Agent, or Firm* — Harness, Dickey & Pierce, P.L.C.

(57) ABSTRACT

A physical quantity sensor includes: an oscillating body having a support section and a movable section which is connected to the support section through connection portions, in which the movable section has a first movable portion and a second movable portion; a first fixed electrode which is disposed to face the first movable portion; a second fixed electrode which is disposed to face the second movable portion; and a dummy electrode which is disposed to face the second movable portion so as not to overlap the second fixed electrode and has the same potential as potential of the oscillating body, in which the first fixed electrode is disposed such that a portion thereof overlaps the support section when viewed in a plan view.

20 Claims, 21 Drawing Sheets

(56) References Cited

U.S. PATENT DOCUMENTS

| | | |
|---|---|---|
| 5,594,172 A | 1/1997 | Shinohara |
| 6,577,975 B2 | 6/2003 | Chiesa |
| 8,079,262 B2 | 12/2011 | Guo |
| 2008/0134785 A1 | 6/2008 | Pruetz |
| 2009/0194397 A1 | 8/2009 | Merassi et al. |
| 2010/0122578 A1 | 5/2010 | Classen |
| 2010/0186508 A1 | 7/2010 | Guenther et al. |
| 2011/0048131 A1 | 3/2011 | Reinmuth |
| 2012/0031185 A1 | 2/2012 | Classen et al. |
| 2013/0042684 A1 | 2/2013 | Yoda |
| 2013/0192370 A1 | 8/2013 | Yoda |
| 2013/0228013 A1 | 9/2013 | Tanaka |
| 2013/0229193 A1 | 9/2013 | Kakimoto et al. |
| 2013/0264661 A1 | 10/2013 | Tanaka |
| 2013/0269434 A1 | 10/2013 | Kamisuki |
| 2014/0144235 A1 | 5/2014 | Suzuki |
| 2014/0174183 A1 | 6/2014 | Comi et al. |
| 2014/0208849 A1 | 7/2014 | Zhang |
| 2014/0338451 A1 | 11/2014 | Takagi |
| 2015/0013458 A1 | 1/2015 | Tanaka |
| 2015/0298967 A1 | 10/2015 | Tanaka |
| 2015/0368089 A1 | 12/2015 | Goda et al. |
| 2016/0047839 A1 | 2/2016 | Tanaka |

FOREIGN PATENT DOCUMENTS

| | | |
|---|---|---|
| JP | 2002-202320 A | 7/2002 |
| JP | 2007-298405 A | 11/2007 |
| JP | 2012-157941 A | 8/2012 |
| JP | 2012-181030 A | 9/2012 |
| JP | 2012-185418 A | 9/2012 |
| JP | 2012-220262 A | 11/2012 |
| JP | 2013-011549 A | 1/2013 |
| JP | 2013-040856 A | 2/2013 |
| JP | 2013-156121 A | 8/2013 |
| JP | 2013-160554 A | 8/2013 |
| JP | 2013-181884 A | 9/2013 |
| JP | 2013-217772 A | 10/2013 |

* cited by examiner

PHYSICAL QUANTITY SENSOR, PHYSICAL QUANTITY SENSOR DEVICE, ELECTRONIC EQUIPMENT, AND MOVING BODY

CROSS-REFERENCE TO RELATED APPLICATIONS

This application is a divisional of U.S. patent application Ser. No. 14/822,041, filed Aug. 10, 2015, which claims priority to Japanese Patent Application No. 2014-165431, filed Aug. 15, 2014, Japanese Patent Application No. 2014-166926, filed Aug. 19, 2014, Japanese Patent Application No. 2014-166927, filed Aug. 19, 2014, and Japanese Patent Application No. 2015-114928, filed Jun. 5, 2015, all of which are hereby expressly incorporated by reference herein in their entireties.

BACKGROUND

1. Technical Field

The present invention relates to a physical quantity sensor, a physical quantity sensor device, electronic equipment, and a moving body.

2. Related Art

In recent years, a physical quantity sensor for detecting a physical quantity such as acceleration by using, for example, a silicon micro electro mechanical systems (MEMS) technique has been developed.

As the physical quantity sensor, a physical quantity sensor having a movable electrode which has a large plate portion and a small plate portion and is supported on an insulating layer such that the plate portions can oscillate in a seesaw manner, a fixed electrode which is provided on the insulating layer to face the large plate portion, and a fixed electrode which is provided on the insulating layer to face the small plate portion is known (refer to, for example, JP-A-2007-298405).

In the physical quantity sensor described in JP-A-2007-298405, when anodically bonding a structural body (a Si structural body) provided with a movable electrode to a glass substrate, if a glass exposed surface facing the structural body is large, an electrostatic force which is generated increases, and therefore, there is a problem in that sticking of the structural body to the glass substrate occurs.

In order to solve such a problem, an attempt to suppress sticking of a movable body to a substrate by providing an opposite electrode (a dummy electrode) having the same potential as the potential of a movable electrode has been made (refer to, for example, JP-A-2013-160554).

However, in the physical quantity sensor described in JP-A-2013-160554, the occurrence of sticking of the movable electrode can be reduced by the dummy electrode. However, a difference in capacitance (a capacity offset) between each fixed electrode and the movable electrode occurs, and according to the variation thereof, yield is deteriorated beyond an adjustment range of an integrated circuit (IC). Further, there is a problem in that a capacity offset affects the entire sensor (refer to, for example, JP-A-2002-202320).

SUMMARY

The invention can be realized in the following aspects or application examples.

Application Example 1

According to this application example, there is provided a physical quantity sensor including: a movable electrode having a support section and a movable section which is connected to the support section through a connection portion and can oscillate with respect to the support section, in which the movable section has a first movable portion which is provided on one side with respect to the connection portion, and a second movable portion which is provided on the other side; a first fixed electrode which is disposed to face the first movable portion; a second fixed electrode which is disposed to face the second movable portion; and an opposite electrode which is disposed to face the second movable portion so as not to overlap the second fixed electrode and has the same potential as potential of the movable electrode, in which the first fixed electrode is disposed such that a portion thereof overlaps the support section when viewed in a plan view.

In this way, a physical quantity sensor in which it is possible to reduce deviation of capacitance is obtained.

Application Example 2

In the physical quantity sensor according to the above-described Application Example, it is preferable that the second fixed electrode is disposed such that a portion thereof overlaps the support section when viewed in a plan view, and when an area of a region overlapping the support section, of the first fixed electrode, is set to be S1 and an area of a region overlapping the support section, of the second fixed electrode, is set to be S2, a relationship of S1>S2 is satisfied.

In this way, it is possible to more effectively reduce the deviation of capacitance.

Application Example 3

In the physical quantity sensor according to the above-described Application Example, it is preferable that, when capacitance which is generated between the first fixed electrode and the support section is set to be C1, capacitance which is generated between the second fixed electrode and the support section is set to be C2, and capacitance which is generated between the second fixed electrode and the opposite electrode is set to be C3, a relationship of $(C2+C3) \times 0.9 \le C1 \le (C2+C3) \times 1.1$ is satisfied.

In this way, it is possible to sufficiently reduce the deviation of capacitance.

Application Example 4

In the physical quantity sensor according to the above-described application example, it is preferable that the opposite electrode is disposed on the side opposite to the support section, of the second fixed electrode.

In this way, overlapping of the second fixed electrode with the support section is not inhibited.

Application Example 5

In the physical quantity sensor according to the above-described application example, it is preferable that when the movable section is viewed in a plan view, the second movable portion has a larger area than the first movable portion.

In this way, it is possible to make the rotational moments of the first movable portion and the second movable portion different from each other with a simple configuration.

Application Example 6

In the physical quantity sensor according to the above-described application example, it is preferable that the support section is disposed in an opening and located between the first movable portion and the second movable portion when viewed in a plan view.

In this way, it is possible to overlap the support section and the first and second fixed electrode with a simple configuration.

Application Example 7

In the physical quantity sensor according to the above-described application example, it is preferable that the movable section has an opening portion between the first movable portion and the second movable portion and the support section is disposed in the opening portion.

In this way, the configuration of the movable electrode is simplified.

Application Example 8

A physical quantity sensor device according to this application example includes an electronic component which is electrically connected to the physical quantity sensor.

In this way, a physical quantity sensor device having high reliability is obtained.

Application Example 9

Electronic equipment according to this application example includes the physical quantity sensor according to any one of the above application examples.

In this way, electronic equipment having high reliability is obtained.

Application Example 10

A moving body according to this application example includes the physical quantity sensor according to any one of the above application examples.

In this way, a moving body having high reliability is obtained.

Application Example 11

According to this application example, there is provided a physical quantity sensor including: a substrate; a support section which is fixed to the substrate; a movable section which is connected to the support section through a connection portion and can oscillate with respect to the support section; and a fixed electrode which is disposed on the substrate to face the movable section, in which the movable section includes a first mass portion which is provided on one side with respect to the connection portion, a second mass portion which is provided on the other side and has a mass larger than the first mass portion, a first movable electrode disposed in the first mass portion, and a second movable electrode disposed in the second mass portion, the fixed electrode includes a first fixed electrode which is disposed to face the first mass portion, a second fixed electrode which is disposed to face the second mass portion, and a dummy electrode which is disposed to face the movable section so as not to come into contact with the first fixed electrode and the second fixed electrode and has the same potential as potential of the movable section, the dummy electrode includes a first dummy electrode provided between the first fixed electrode and the second fixed electrode, a second dummy electrode provided on the side opposite to the first dummy electrode, of the first fixed electrode, and a third dummy electrode provided on the side opposite to the first dummy electrode, of the second fixed electrode, and the fixed electrode and the dummy electrode are disposed such that a capacity offset is smaller than a capacity offset in a case where distances between the first fixed electrode and the first and second dummy electrodes and distances between the second fixed electrode and the first and third dummy electrodes are the same.

In this way, it is possible to prevent the occurrence of sticking and reduce a capacity offset.

Application Example 12

In the physical quantity sensor according to the above-described Application Example, it is preferable that, when a distance between the first fixed electrode and the first dummy electrode is set to be w1, a distance between the second fixed electrode and the first dummy electrode is set to be w2, a distance between the first fixed electrode and the second dummy electrode is set to be w3, and a distance between the second fixed electrode and the third dummy electrode is set to be w4, a relationship of w1<w2 and w3=w4 is satisfied.

In this way, it is possible to more easily reduce the capacity offset.

Application Example 13

In the physical quantity sensor according to the above-described Application Example, it is preferable that, when a distance between the first fixed electrode and the first dummy electrode is set to be w1, a distance between the second fixed electrode and the first dummy electrode is set to be w2, a distance between the first fixed electrode and the second dummy electrode is set to be w3, and a distance between the second fixed electrode and the third dummy electrode is set to be w4, a relationship of w1<w2 and w3<w4 is satisfied.

In this way, it is possible to more easily reduce the capacity offset.

Application Example 14

In the physical quantity sensor according to the above-described Application Example, it is preferable that, when a distance between the first fixed electrode and the first dummy electrode is set to be w1, a distance between the second fixed electrode and the first dummy electrode is set to be w2, a distance between the first fixed electrode and the second dummy electrode is set to be w3, and a distance between the second fixed electrode and the third dummy electrode is set to be w4, a relationship of w1<w2 and w3>w4 is satisfied.

In this way, it is possible to more easily reduce the capacity offset.

Application Example 15

In the physical quantity sensor according to the above-described Application Example, it is preferable that, when a distance between the first fixed electrode and the first dummy electrode is set to be w1, a distance between the second fixed electrode and the first dummy electrode is set to be w2, a distance between the first fixed electrode and the second dummy electrode is set to be w3, and a distance between the second fixed electrode and the third dummy electrode is set to be w4, a relationship of w1>w2 and w3<w4 is satisfied.

In this way, it is possible to more easily reduce the capacity offset.

Application Example 16

In the physical quantity sensor according to the above-described application example, it is preferable that the substrate is a glass substrate.

In this way, it is possible to easily electrically insulate the movable section and the substrate, and thus it is possible to simplify a sensor structure.

Application Example 17

According to this application example, there is provided a physical quantity sensor including: a substrate; a support section which is fixed to the substrate; a movable section which is connected to the support section through a connection portion and can oscillate with respect to the support section; and a fixed electrode which is disposed on the substrate to face the movable section, in which the movable section includes a first mass portion which is provided on one side with respect to the connection portion, and a second mass portion which is provided on the other side and has a mass larger than the first mass portion, the fixed electrode includes a first fixed electrode which is disposed to face the first mass portion, a second fixed electrode which is disposed to face the second mass portion, and a dummy electrode which is disposed to face the movable section so as not to come into contact with the first fixed electrode and the second fixed electrode and has the same potential as potential of the movable section, and when an axial direction in which the movable section is oscillated is set to be a Y-axis direction, at least one of a width in the Y-axis direction of the dummy electrode disposed alongside the first fixed electrode and a width in the Y-axis direction of the first fixed electrode is larger than a width in the Y-axis direction of the second fixed electrode.

In this way, it is possible to prevent the occurrence of the sticking and reduce the capacity offset.

Application Example 18

In the physical quantity sensor according to the above-described application example, it is preferable that the dummy electrode has a first portion which is disposed to face the first fixed electrode in the Y-axis direction.

In this way, it is possible to more easily reduce the capacity offset.

Application Example 19

In the physical quantity sensor according to the above-described application example, it is preferable that the first portion is provided in a pair so as to be located on both sides in the Y-axis direction of the first fixed electrode.

In this way, it is possible to more easily reduce the capacity offset.

Application Example 20

In the physical quantity sensor according to the above-described application example, it is preferable that the first fixed electrode has a second portion which is disposed to face the dummy electrode in the Y-axis direction.

In this way, it is possible to more effectively prevent the occurrence of the sticking while reducing the capacity offset.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, electronic equipment, and a moving body according to the invention will be described in detail based on embodiments shown in the accompanying drawings.

Figure 1:
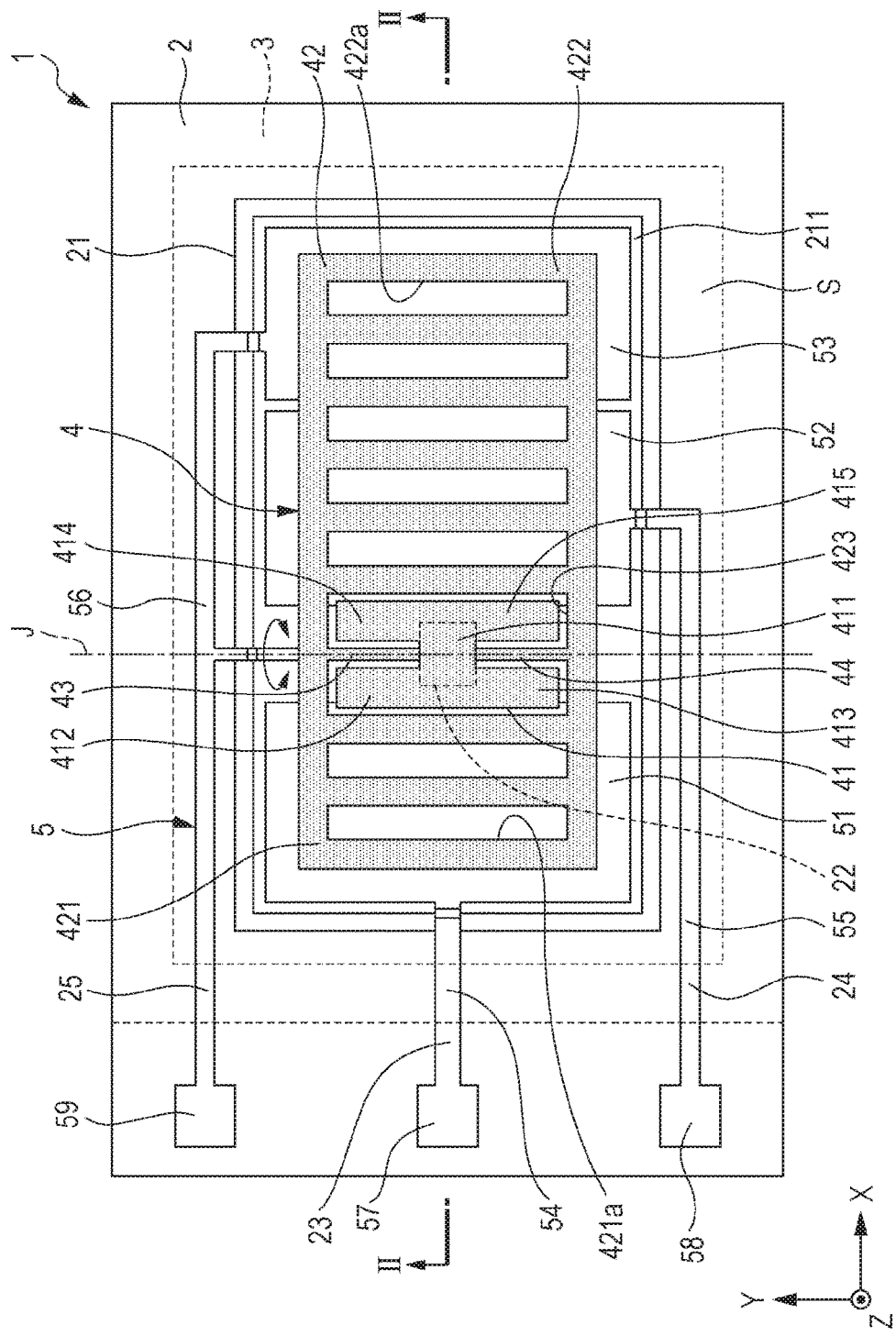
FIG. 1 is a plan view (a top view) showing a physical quantity sensor according to a preferred embodiment of the invention.
Figure 2:
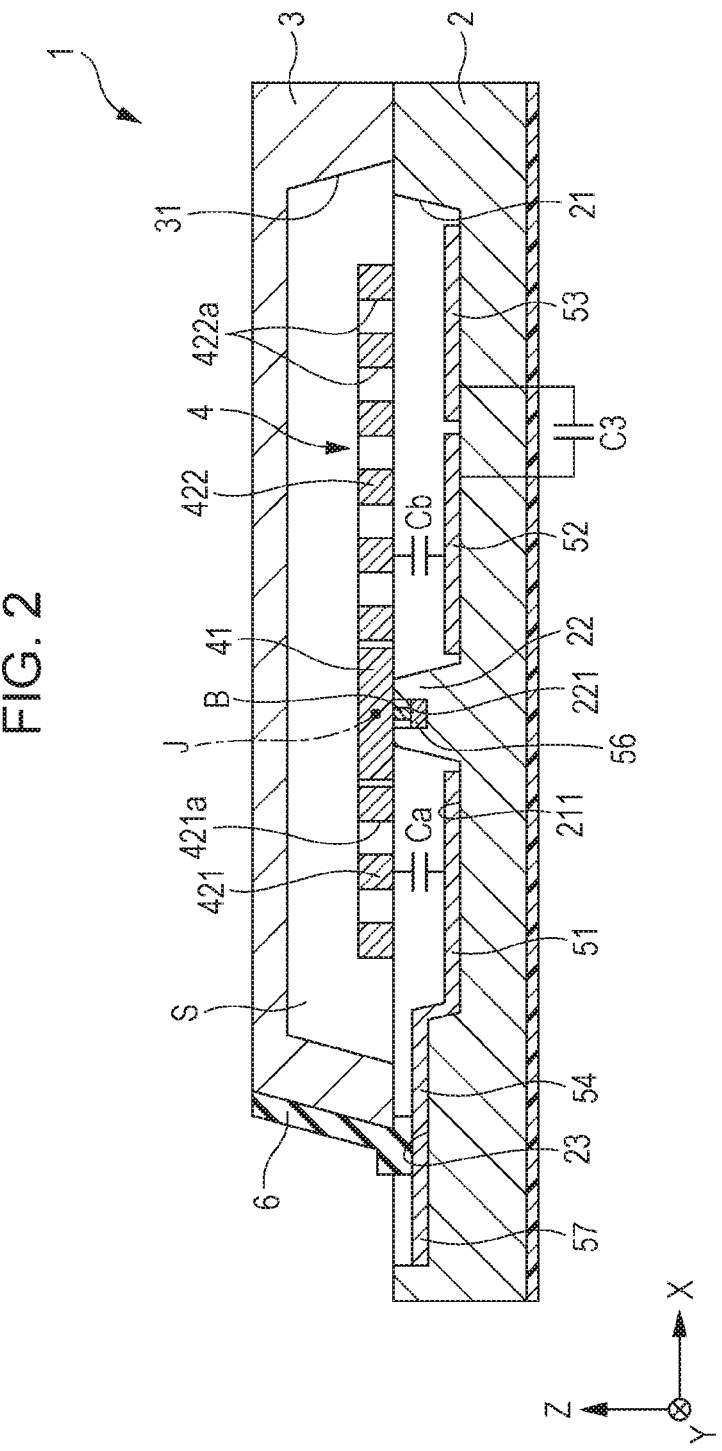
FIG. 2 is a sectional view along line II-II of FIG. 1.
Figure 3A:
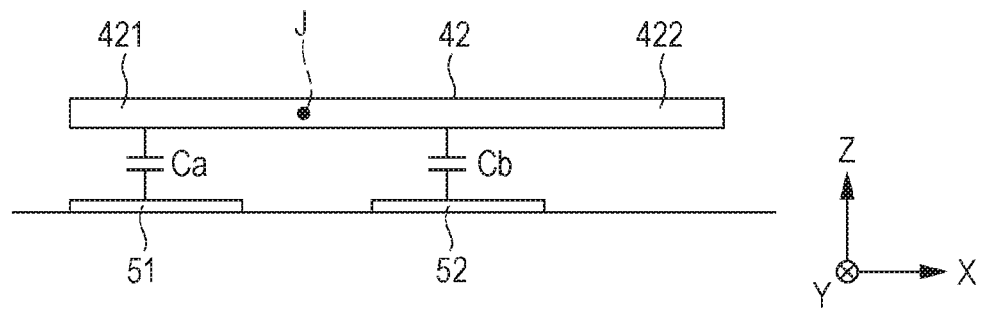
FIGS. 3A to 3C are schematic diagrams for describing the driving of the physical quantity sensor shown in FIG. 1.
Figure 3B:
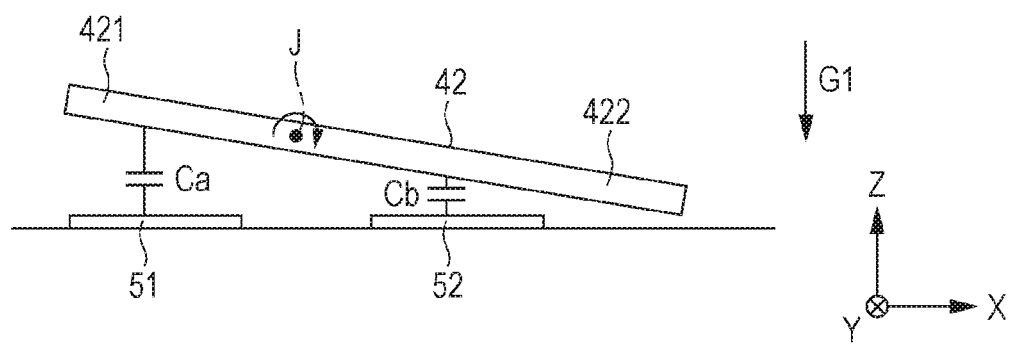
Figure 3C:
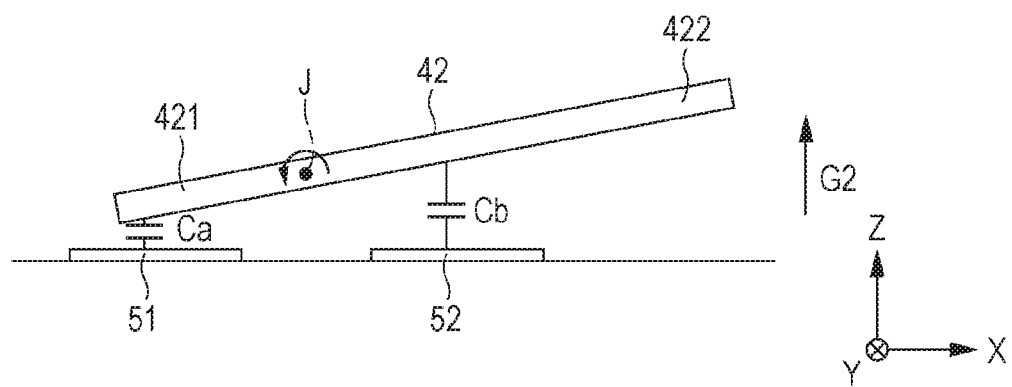
Figure 4:
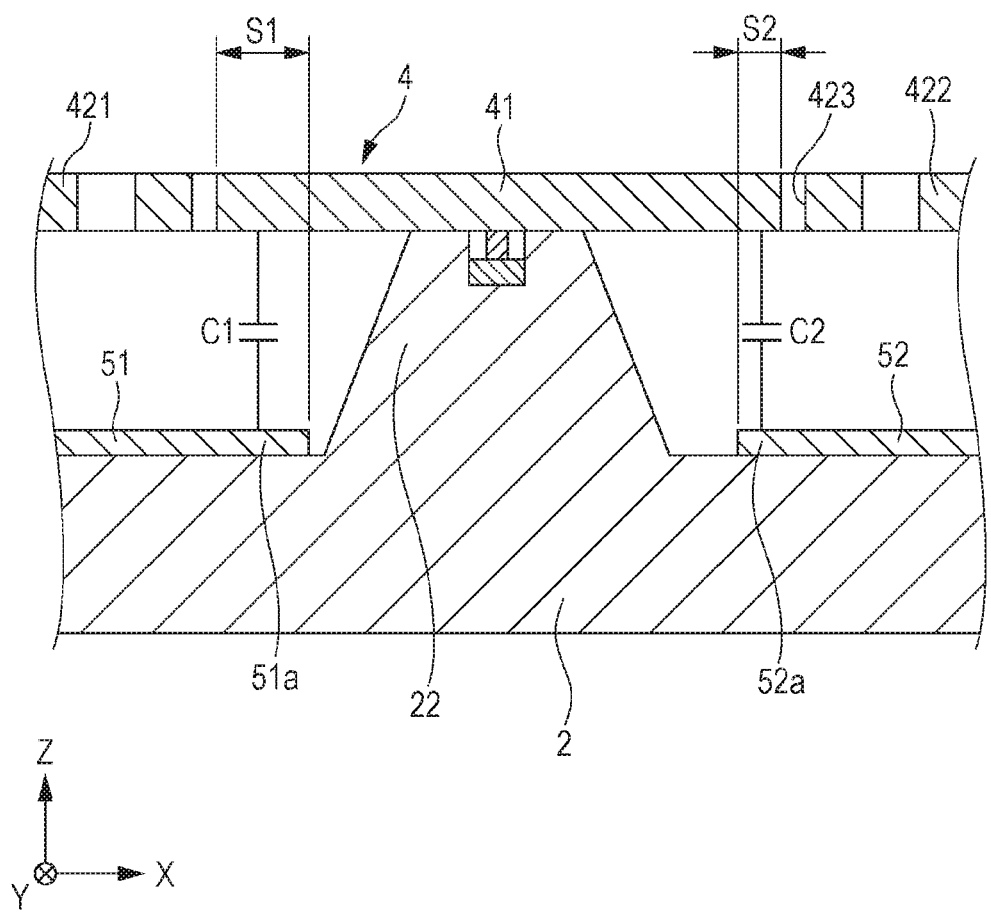
FIG. 4 is a partial enlarged sectional view of the physical quantity sensor shown in FIG. 1.

FIG. 1 is a plan view (a top view) showing a physical quantity sensor according to a preferred embodiment of the invention. FIG. 2 is a sectional view along line II-II of FIG. 1. FIGS. 3A to 3C are schematic diagrams for describing the driving of the physical quantity sensor shown in FIG. 1. FIG. 4 is a partial enlarged sectional view of the physical quantity sensor shown in FIG. 1. In addition, in the following, for convenience of description, the front side of the plane of FIG. 1 will be referred to as a "top" and the back side of the plane of FIG. 1 will be referred to as a "bottom". Further, in each of the drawings, as three axes orthogonal to each other, an X-axis, a Y-axis, and a Z-axis are shown. Further, in the following, a direction parallel to the X-axis will be referred to as an "X-axis direction", a direction parallel to the Y-axis will be referred to as a "Y-axis direction", and a direction parallel to the Z-axis will be referred to as a "Z-axis direction".

1. Physical Quantity Sensor

First, the physical quantity sensor according to the invention will be described.

A physical quantity sensor 1 shown in FIGS. 1 and 2 can be used as, for example, an inertial sensor and specifically, is available as an acceleration sensor for measuring acceleration in the Z-axis direction (a vertical direction). The physical quantity sensor 1 includes a base substrate 2, a lid body 3, and an oscillating body (a movable electrode) 4 disposed in an internal space S formed by the base substrate 2 and the lid body 3.

Base Substrate

The base substrate 2 has a plate shape. Further, a concave portion 21 which is open at a central portion excluding an edge portion of the base substrate 2 is formed in the upper surface of the base substrate 2. The concave portion 21 functions as an escape portion for preventing the contact between the oscillating body 4 and the base substrate 2. Further, a convex portion 22 which protrudes in an island form from a bottom surface 211 of the concave portion 21 is provided at a central portion of the concave portion 21, and the oscillating body 4 is fixed to the convex portion 22 so as to be able to oscillate in a seesaw manner (rotate around an axis J). Further, the side surface of the concave portion 21 and the side surface of the convex portion 22 are configured as inclined surfaces, whereby the routing of wiring from the bottom surface 211 of the concave portion 21 to the upper surface of the base substrate 2 is facilitated, and thus poor formation, disconnection, or the like of the wiring is reduced. Further, concave portions 23, 24, and 25 which are disposed around the concave portion 21 and are open on the upper surface are formed in the base substrate 2, and a portion of a conductor pattern 5 is disposed in each of the concave portions 23, 24, and 25.

As a constituent material of the base substrate 2, a material having an insulation property is favorable, and in this embodiment, a glass material is used. In this way, anodic bonding can be used for the joining of the base substrate 2 and the oscillating body 4. However, as a constituent material of the base substrate 2, it is not limited to the glass material, and for example, a high resistance silicon material may be used.

The conductor pattern 5 is formed on the base substrate 2. The conductor pattern 5 has, as electrodes, a first fixed electrode 51, a second fixed electrode 52, and a dummy electrode 53 which are disposed on the bottom surface 211 of the concave portion 21. Further, the conductor pattern 5 has, as wiring, wiring 54 which is connected to the first fixed electrode 51 in the concave portion 21 and routed in the concave portion 23, wiring 55 which is connected to the second fixed electrode 52 in the concave portion 21 and routed in the concave portion 24, and wiring 56 which is connected to the dummy electrode 53 in the concave portion 21, connected to the oscillating body 4 at the convex portion 22, and routed in the concave portion 25. In addition, a groove 221 is formed in the upper surface of the convex portion 22, and the wiring 56 is routed in the groove 221 and connected to the oscillating body 4 through an electrically-conductive bump B at the top of the convex portion 22. Further, the conductor pattern 5 has, as terminals, a terminal 57 which is disposed in the concave portion 23 and connected to the wiring 54, a terminal 58 which is disposed in the concave portion 24 and connected to the wiring 55, and a terminal 59 which is disposed in the concave portion 25 and connected to the wiring 56. The terminals 57, 58, and 59 of the conductor pattern 5 having such a configuration are disposed so as to be exposed from the lid body 3, whereby the contact between the conductor pattern 5 and the outside (for example, an IC chip 102 which will be described later) becomes possible.

In addition, the detailed disposition or the effects of the first fixed electrode 51, the second fixed electrode 52, and the dummy electrode 53 will be described later.

As a constituent material of the conductor pattern 5, as long as it has electrical conductivity, there is no particular limitation, and for example, an oxide (a transparent electrode material) such as ITO (Indium Tin Oxide), IZO (Indium Zinc Oxide), $In_2O_3$, $SnO_2$, Sb-containing $SnO_2$, or Al-containing ZnO, Au, Pt, Ag, Cu, Al, or an alloy containing these, or the like can be given, and among these, one type or two or more types can be used in combination.

Oscillating Body

The oscillating body 4 is provided above the base substrate 2, as shown in FIGS. 1 and 2. The oscillating body 4 has a support section 41, a movable section 42, and a pair of connection portions 43 and 44 which connects the movable section 42 and the support section 41 so as to allow the movable section 42 to oscillate with respect to the support section 41. Then, a configuration is made such that the movable section 42 oscillates with respect to the support section 41 in a seesaw manner with the connection portions 43 and 44 as the axis J.

Further, the movable section 42 has a longitudinal shape (a substantially rectangular shape) extending in the X-axis direction, and the −X-axis direction side (one side) thereof is made to be a first movable portion 421 and the +X-axis direction side (the other side) is made to be a second movable portion 422. Further, a plurality of slits 421a and 422a which are provided in parallel in the X-axis direction and extend in the Y-axis direction are respectively formed in the first and second movable portions 421 and 422. In this way, resistance to the seesaw oscillation of the movable section 42 is reduced. Further, an opening 423 is formed between the first movable portion 421 and the second movable portion 422, and the support section 41 and the connection portions 43 and 44 are disposed on the inside of the opening 423.

Further, the first and second movable portions 421 and 422 are designed such that rotational moments when acceleration in the vertical direction (the Z-axis direction) is applied thereto are different from each other and predetermined inclination occurs in the movable section 42 according to the acceleration. In this way, if acceleration in the vertical direction occurs, the movable section 42 oscillates in a seesaw manner around the axis J. Specifically, in this embodiment, a design is made such that the rotational moment of the second movable portion 422 becomes larger than the rotational moment of the first movable portion 421 by making the area (the distance from the axis J to an end on the +X-axis side) of the second movable portion 422 larger than the area (the distance from the axis J to an end on the −X-axis side) of the first movable portion 421, when viewed in a plan view, in other words, by making the mass of the second movable portion 422 larger than the mass of the first movable portion 421. With such a design, it is possible to easily make the rotational moments of the first and second movable portions 421 and 422 different from each other. Further, it is possible to sufficiently widely form the dummy electrode 53, as will be described later.

In addition, as the shapes of the first and second movable portions 421 and 422, as long as they have rotational moments different from each other, as described above, there is no particular limitation, and for example, a configuration is also acceptable in which the shapes in a plan view are the same and thicknesses are different. Further, a configuration is also acceptable in which the shapes are the same and a weight portion is disposed in either. The weight portion may be disposed as a separate body made of a weight material such as tungsten or molybdenum, for example, and may also be formed integrally with the movable section 42.

Further, the support section 41 is disposed in the opening 423 and joined to the convex portion 22 of the base substrate 2. Further, the connection portions 43 and 44 are also disposed in the opening 423, and the support section 41 and the movable section 42 are connected by the connection portions 43 and 44. Further, the connection portions 43 and are coaxially located on both sides of the support section 41. In this way, if acceleration in the vertical direction is applied, the movable section 42 oscillates in a seesaw manner around the axis J while the connection portions 43 and 44 are torsionally deformed.

Further, the support section 41 has a substantially H-shaped planar shape, as shown in FIG. 1. Specifically, the support section 41 has a base portion 411 which is located at a central portion and joined to the convex portion 22 and to which the connection portions 43 and 44 are connected, extending portions 412 and 413 which extend (protrude) from an end portion on the −X-axis side of the base portion 411 to both sides in the Y-axis direction, and extending portions 414 and 415 which extend from an end portion on the +X-axis side of the base portion 411 to both sides in the Y-axis direction. Then, the extending portions 412 and 413 are located between the connection portions 43 and 44 and the first movable portion 421, and the extending portions 414 and 415 are located between the connection portions 43 and 44 and the second movable portion 422. By providing the extending portions 412 to 415, it is possible to sufficiently widely secure each of the overlapping area of the support section 41 and the first fixed electrode 51 and the overlapping area of the support section 41 and the second fixed electrode 52, as will be described later, and thus it is possible to perform the adjustment of capacitance within a wide range. In addition, the shape of the support section 41 is not particularly limited, and for example, the extending portions 412 to 415 may be omitted.

In this embodiment, the oscillating body 4 is formed of a silicon substrate doped with impurities such as phosphorus or boron. In this way, it is possible to perform processing with high precision by etching, and therefore, it is possible to provide the oscillating body 4 with excellent dimensional precision. Further, it is possible to join the oscillating body 4 to the base substrate 2 (the convex portion 22) by anodic bonding. However, as a material of the oscillating body 4, it is not limited to silicon. Further, a method of providing electrical conductivity is also not limited to doping, and for example, a conductor layer such as metal may be formed on the surface of the movable section 42.

The disposition of the first and second fixed electrodes 51 and 52 and the dummy electrode 53 with respect to the oscillating body 4 is as follows. That is, as shown in FIGS. 1 and 2, the first fixed electrode 51 is disposed on the bottom surface 211 so as to face the first movable portion 421 and forms capacitance Ca between itself and the first movable portion 421. Further, the second fixed electrode 52 is disposed on the bottom surface 211 so as to face the second movable portion 422 and forms capacitance Cb between itself and the second movable portion 422. Further, the dummy electrode 53 is located so as to face the second movable portion 422 and is further toward the +X-axis direction side (the tip side of the second movable portion 422) than the second fixed electrode 52. The first and second fixed electrodes 51 and 52 and the dummy electrode 53 are disposed so as not to overlap by being separated from each other and are insulated from each other.

Among the three electrodes 51 to 53, the first and second fixed electrodes 51 and 52 are electrodes which are used for acceleration sensing, and the remaining dummy electrode 53 is an electrode for reducing the occurrence of sticking at the time of manufacturing. As described above, the oscillating body 4 (more precisely, a silicon substrate before patterning of the oscillating body 4) and the base substrate 2 are joined to each other by anodic bonding. However, there is a case where an electrostatic force is generated between the oscillating body 4 and the base substrate 2 due to voltage which is applied at this time and the oscillating body 4 is stuck to the base substrate 2 by the electrostatic force. For this reason, in this embodiment, the dummy electrode 53 having the same potential as the potential of the oscillating body 4 is provided on the surface (the bottom surface 211) facing the oscillating body 4, of the base substrate 2, thereby reducing the electrostatic force, and thus the sticking of the oscillating body 4 to the base substrate 2 as described above is reduced.

Lid Body

The lid body 3 has a concave portion 31 which is open at the lower surface, and is joined to the base substrate 2 such that the concave portion 31 forms the internal space S along with the concave portion 21. In this embodiment, the lid body 3 is formed of a silicon substrate. In this way, the lid body 3 and the base substrate 2 can be joined to each other by anodic bonding. In addition, in a state where the lid body 3 is simply joined to the base substrate 2, the inside and the outside of the internal space S communicate with each other through the concave portions 23, 24, and 25 formed in the base substrate 2. For this reason, in this embodiment, as shown in FIG. 2, the concave portions 23, 24, and 25 are sealed by a $SiO_2$ film 6 formed by a TEOSCVD method or the like, and thus the internal space S is hermetically sealed.

The configuration of the physical quantity sensor 1 has been briefly described above. In the physical quantity sensor 1, it is possible to detect acceleration in the vertical direction in the following manner. In a case where acceleration in the vertical direction is not applied to the physical quantity sensor 1, the movable section 42 maintains a horizontal state, as shown in FIG. 3A. Then, if vertical downward (−Z-axis direction) acceleration G1 is applied to the physical quantity sensor 1, due to the different rotational moments of the first and second movable portions 421 and 422, the movable section 42 oscillates in a seesaw manner in a clockwise direction with the axis J as the center, as shown in FIG. 3B. On the contrary, if vertical upward (+Z-axis direction) acceleration G2 is applied to the physical quantity sensor 1, the movable section 42 oscillates in a seesaw manner in a counterclockwise direction with the axis J as the center, as shown in FIG. 3C. Due to the seesaw oscillation of the movable section 42, the distance between the first movable portion 421 and the first fixed electrode 51 and the distance between the second movable portion 422 and the second fixed electrode 52 change, and accordingly, the capacitance Ca and the capacitance Cb change. For this reason, it is possible to detect the value of acceleration based on the amount of change of the capacitance Ca and Cb (differential signals of the capacitance Ca and Cb). Further, it is possible to identify the direction of acceleration (whether it is acceleration on the −Z-axis side or acceleration on the +Z-axis side) from the direction of a change in the capacitance Ca and Cb. In this way, it is possible to detect acceleration by using the physical quantity sensor 1.

In this manner, in the physical quantity sensor 1, acceleration is detected based on the differential signals of the capacitance Ca and Cb, and therefore, it is preferable that a design is made such that the capacitance Ca and the capacitance Cb are approximately equal to each other in a state where acceleration is not applied. With such a design, it is possible to more accurately detect the received acceleration. For this reason, in this embodiment, the movable section 42 is disposed substantially parallel to the bottom surface 211, and thus the gap between the first fixed electrode 51 and the first movable portion 421 and the gap between the second fixed electrode 52 and the second movable portion 422 become substantially equal to each other, and the area of a region overlapping the first movable portion 421, of the first fixed electrode 51, and the area of a region overlapping the second movable portion 422, of the second fixed electrode 52, are made to be substantially equal to each other. In this way, the capacitance Ca and the capacitance Cb are made to be substantially equal to each other. Further, there is also a case where the capacitance Ca and the capacitance Cb are slightly deviated from each other according to manufacturing accuracy, and therefore, in such a case, a correction of making the offset of the capacitance Ca and Cb become zero is performed by using a correction circuit or the like included in the IC chip 102 (described later).

Here, in fact, the capacitance Ca is detected as capacitance Ca' between the terminals 57 and 59, and the capacitance Cb is detected as capacitance Cb' between the terminals 58 and 59. Therefore, even if a design is made such that the capacitance Ca and the capacitance Cb are equal to each other, there is a case where a difference occurs between the capacitance Ca' and the capacitance Cb' due to the influence of parasitic capacitance or the like. If a difference ΔC' between the capacitance Ca' and the capacitance Cb' is small (is within a predetermined range), the correction by the IC chip 102 becomes possible, as described above, and thus there is no problem. However, if the difference ΔC' is large (is outside a predetermined range), the correction by the IC chip 102 as described above is not possible. In such a case, it is not possible to ensure detection accuracy, and as a result, the manufacturing yield of the physical quantity sensor 1 is reduced.

Therefore, in the physical quantity sensor 1, a configuration is made in which preferably, the difference ΔC' between the capacitance Ca' and the capacitance Cb' can become zero such that it is possible to make the difference ΔC' be within a correction range of the IC chip 102. Hereinafter, this will be described in detail. In the physical quantity sensor 1, as described above, the dummy electrode 53 is disposed next to the second fixed electrode 52, and therefore, capacitance (parasitic capacitance) C3 is formed between the second fixed electrode 52 and the dummy electrode 53, as shown in FIG. 2. For this reason, the capacitance C3 is added to the capacitance Cb', and thus the capacitance Cb' becomes larger than the capacitance Ca'.

Therefore, in the physical quantity sensor 1, as shown in FIG. 4, the first fixed electrode 51 is disposed such that a portion thereof overlaps the support section 41 when viewed in a plan view, and thus capacitance C1 is formed between the first fixed electrode 51 and the support section 41, and similarly, the second fixed electrode 52 is disposed such that a portion thereof overlaps the support section 41 when viewed in a plan view, and thus capacitance C2 is formed between the second fixed electrode 52 and the support section 41. Then, the difference ΔC' is reduced by adjusting the magnitude of the capacitance C1 and C2. Specifically, as shown in FIG. 4, a configuration is made such that when the area of a region 51a facing the support section 41, of the first fixed electrode 51 when viewed in a plan view, is set to be S1 and the area of a region 52a facing the support section 41, of the second fixed electrode 52, is set to be S2, a relationship of S1>S2 is satisfied. For this reason, the capacitance C1 becomes larger than the capacitance C2, and accordingly, it is possible to make the difference ΔC' small (preferably, zero). Therefore, it is possible to make the difference ΔC' be within the correction range of the IC chip 102, and thus the manufacturing yield of the physical quantity sensor 1 is improved.

Here, as the relationship between the capacitance C1, C2, and C3, as long as it is possible to exhibit the above effect, there is no particular limitation. However, for example, it is preferable to satisfy a relationship of (C2+C3)×0.9≤C1≤(C2+C3)×1.1, and it is more preferable to satisfy a relationship of (C2+C3)=C1. In this way, it is possible to more remarkably exhibit the above-described effect.

In particular, in this embodiment, the support section 41 is disposed between the first movable portion 421 and the second movable portion 422, and therefore, for example, by extending the first and second fixed electrodes 51 and 52 to the support section 41 side, it is possible to easily form the regions 51a and 52a described above. For this reason, the configuration of the physical quantity sensor 1 becomes simple. Further, as in this embodiment, by forming the opening 423 between the first movable portion 421 and the second movable portion 422 and disposing the support section 41 in the opening 423, the configuration of the oscillating body 4 becomes simple.

Further, the dummy electrode 53 is located on the +X-axis side (the side opposite to the support section 41) of the second fixed electrode 52, and therefore, the formation of the region 52a of the second fixed electrode 52 is not inhibited by the dummy electrode 53. Also in this regard, the configuration of the physical quantity sensor 1 becomes simple.

In addition, in this embodiment, the capacitance C2 is formed. However, the capacitance C2 may not be formed. That is, the second fixed electrode 52 may be disposed so as not to overlap the support section 41 when viewed in a plan view. Also by this, it is possible to exhibit the same effect as described above. Further, in this embodiment, as the parasitic capacitance, only the capacitance C3 is taken into account. However, in addition to this, the magnitude of the capacitance C1 and C2 may be adjusted in consideration of capacitance which is formed between the wiring 54 and the wiring 56, capacitance which is formed between the wiring 55 and the wiring 56, or the like.

2. Physical Quantity Sensor Device

Next, the physical quantity sensor device according to the invention will be described.

Figure 5:
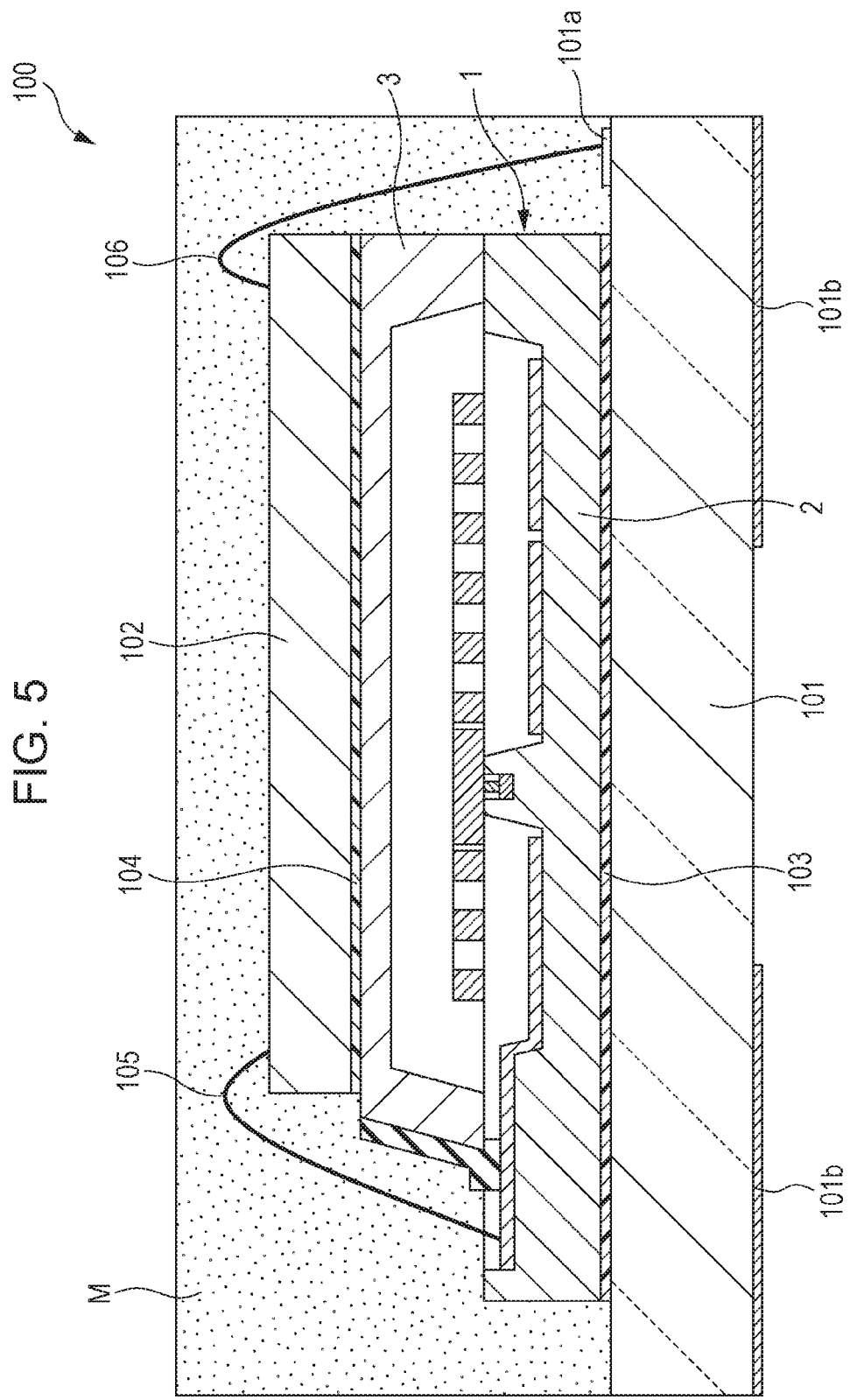
FIG. 5 is a sectional view showing an example of a physical quantity sensor device according to the invention.

FIG. 5 is a sectional view showing an example of the physical quantity sensor device according to the invention.

A physical quantity sensor device 100 shown in FIG. 5 includes a substrate 101, the physical quantity sensor 1 fixed to the upper surface of the substrate 101 through an adhesion layer 103, and the IC chip (an electronic component) 102 fixed to the upper surface of the physical quantity sensor 1 through an adhesion layer 104. Then, the physical quantity sensor 1 and the IC chip 102 are molded by a molding material M in a state where the lower surface of the substrate 101 is exposed. In addition, as the adhesion layers 103 and 104, for example, solder, silver paste, a resin-based adhesive (a die attaching agent), or the like can be used. Further, as the molding material M, for example, thermosetting epoxy resin can be used, and it is possible to perform molding by, for example, a transfer molding method.

Further, a plurality of terminals 101a are disposed on the upper surface of the substrate 101, and a plurality of mounting terminals 101b which are connected to the terminals 101a through internal wiring (not shown) or a castellation are disposed on the lower surface of the substrate 101. As the substrate 101, there is no particular limitation. However, for example, a silicon substrate, a ceramic substrate, a resin substrate, a glass substrate, a glass epoxy substrate, or the like can be used.

Further, in the IC chip 102, for example, a drive circuit for driving the physical quantity sensor 1, a correction circuit for correcting the difference ΔC' described above, a detection circuit for detecting acceleration from the differential signals of the capacitance Ca' and Cb', an output circuit for converting a signal from the detection circuit into a predetermined signal and outputting the converted signal, and the like are included. The IC chip 102 is electrically connected to the terminals 57, 58, and 59 of the physical quantity sensor 1 through bonding wires 105 and electrically connected to the terminals 101a of the substrate 101 through bonding wires 106.

The physical quantity sensor device 100 has excellent reliability, because it is provided with the physical quantity sensor 1.

Next, a physical quantity sensor of FIG. 6 will be described with reference to the drawings.

Figure 6:
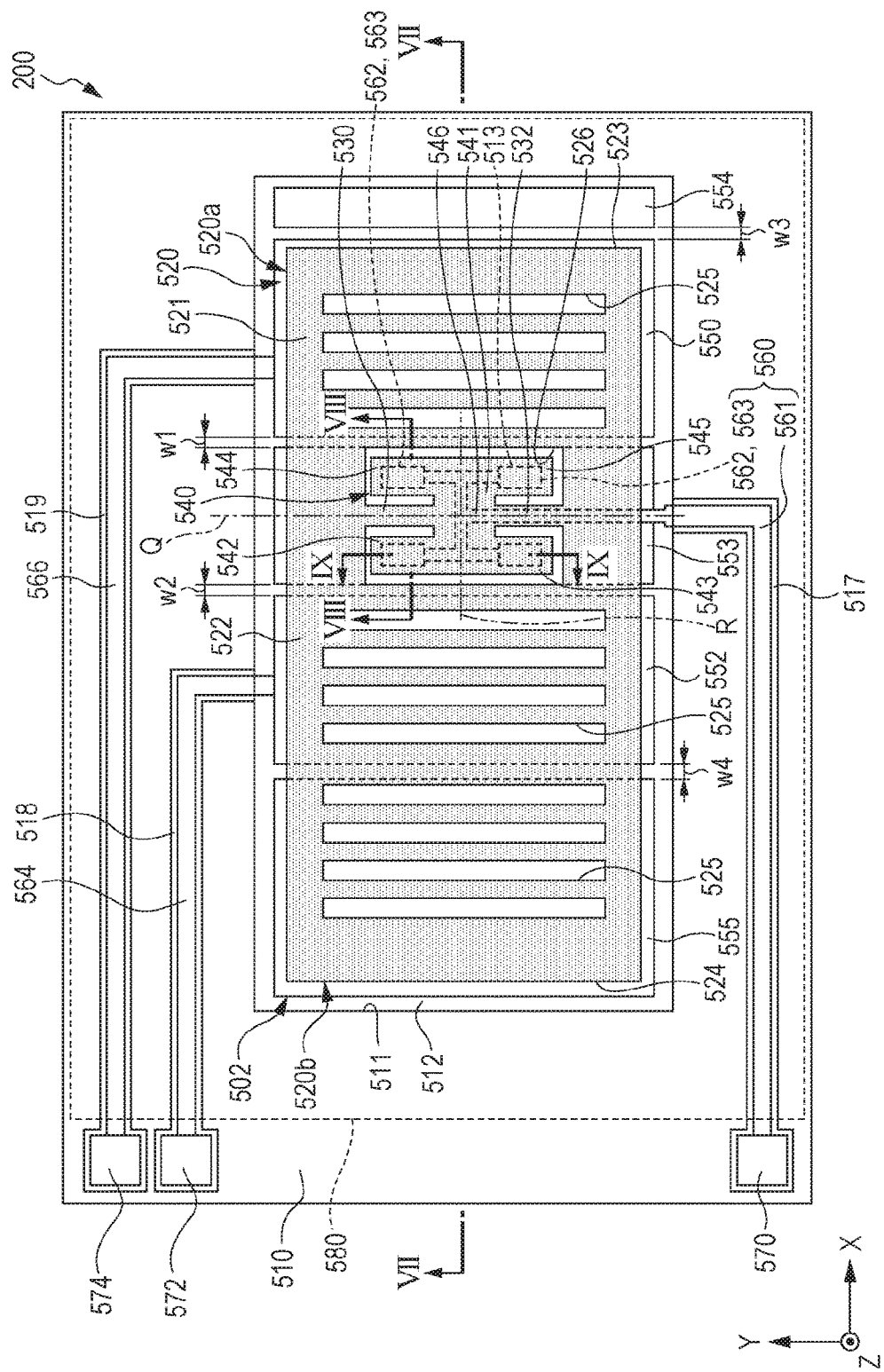
FIG. 6 is a plan view showing a physical quantity sensor according to a preferred embodiment of the invention.
Figure 7:
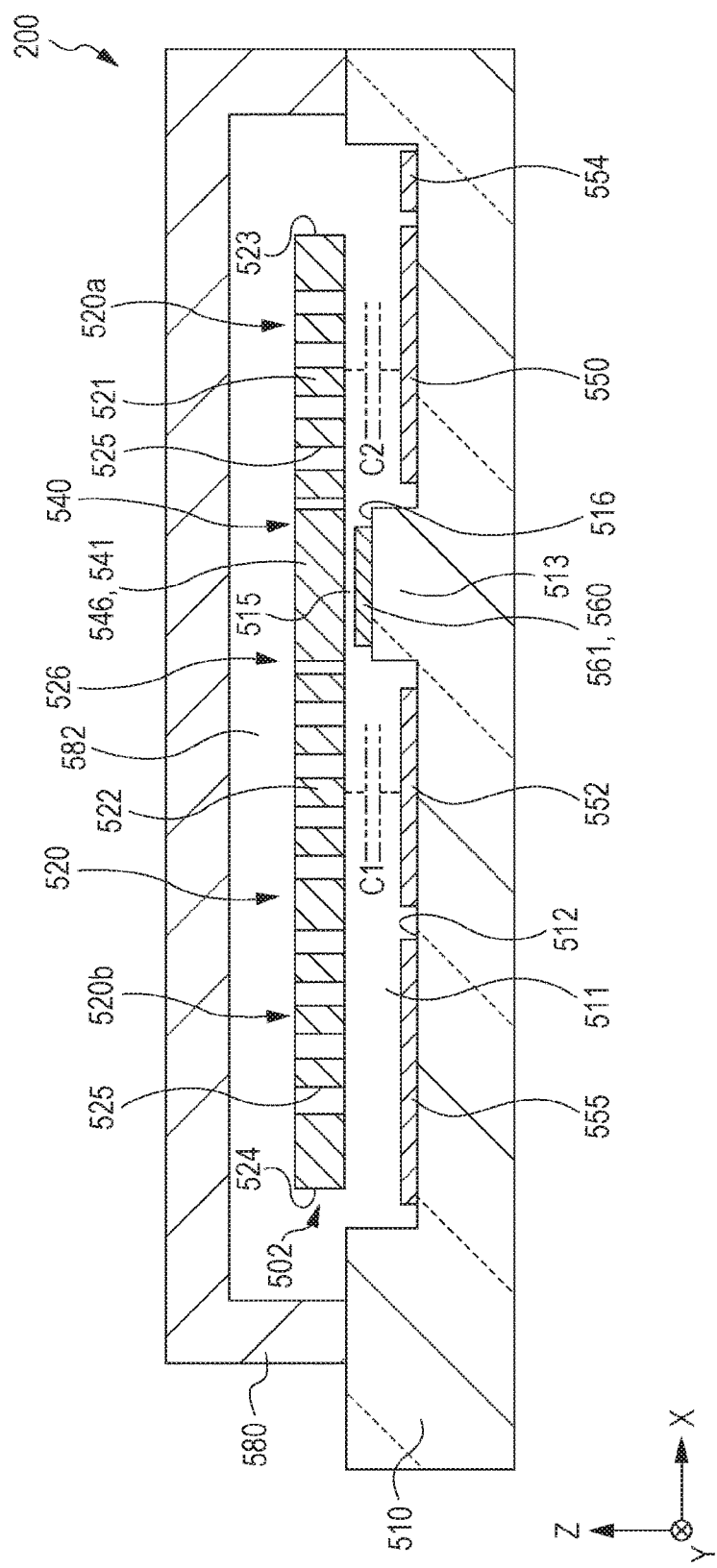
FIG. 7 is a sectional view along line VII-VII of FIG. 6, showing the physical quantity sensor of FIG. 6.
Figure 8:
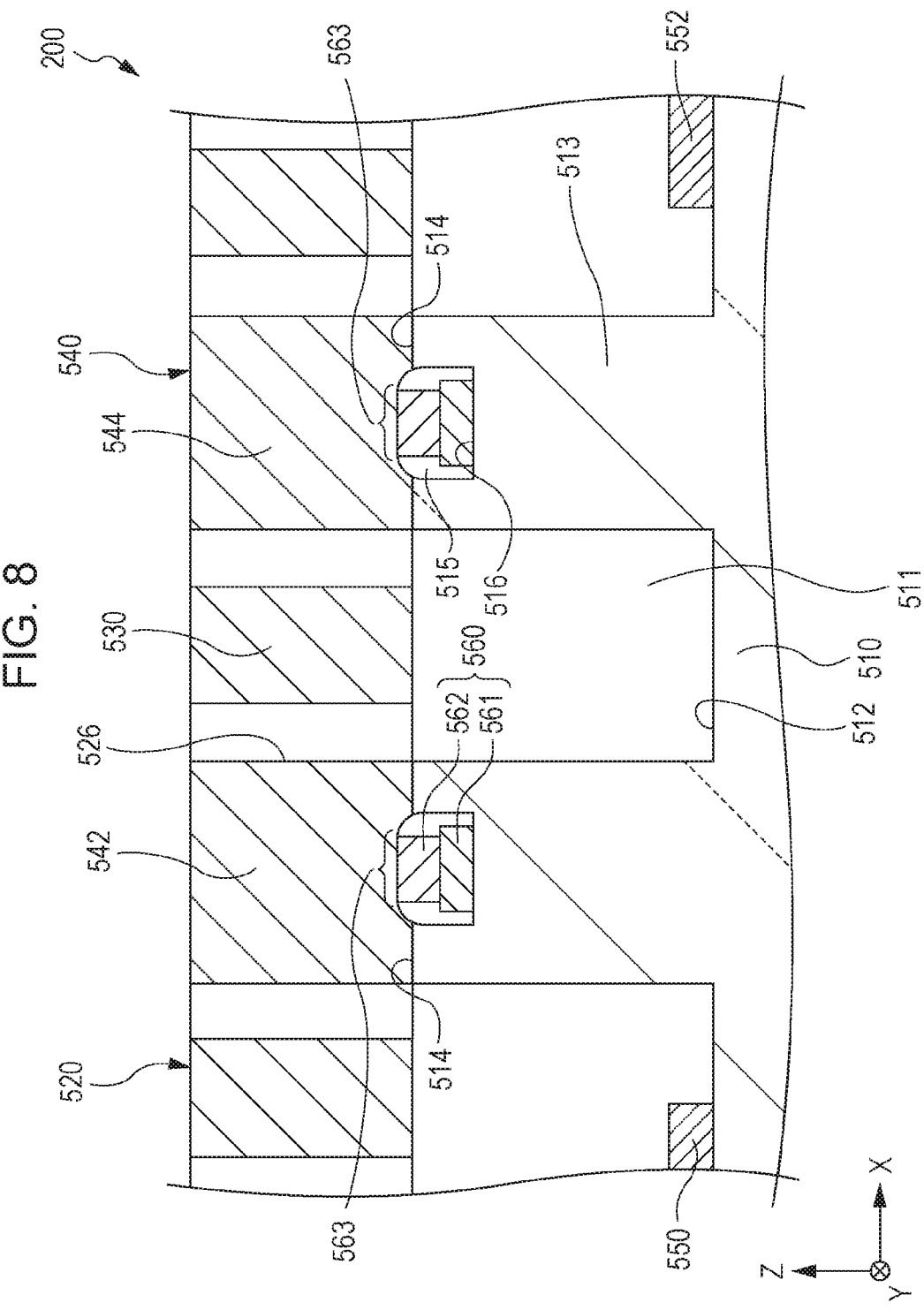
FIG. 8 is a sectional view along line VIII-VIII of FIG. 6, showing the physical quantity sensor of FIG. 6.
Figure 9:
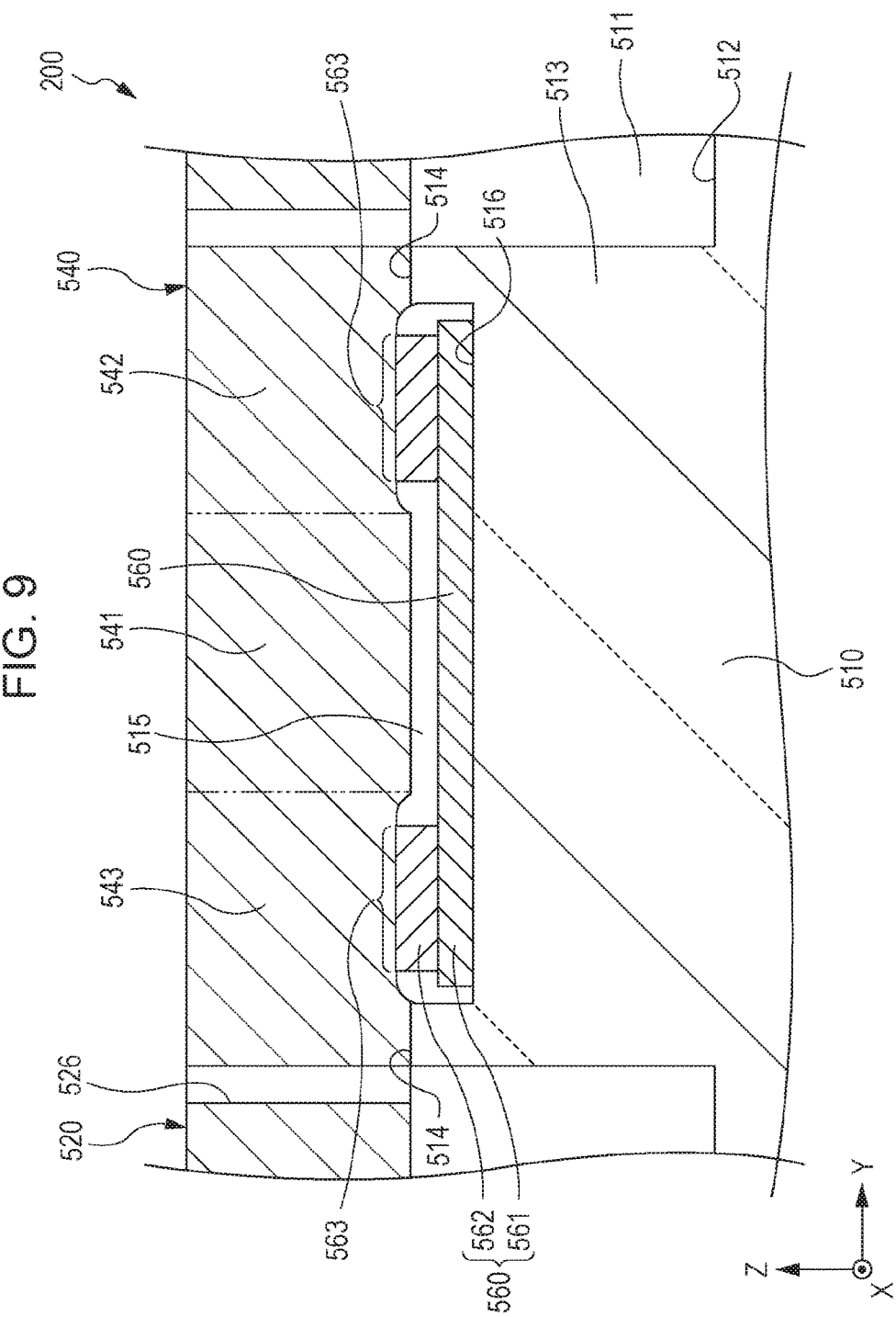
FIG. 9 is a sectional view along line IX-IX of FIG. 6, showing the physical quantity sensor of FIG. 6.

FIG. 6 is a plan view showing a physical quantity sensor 200 according to a preferred embodiment of the invention, FIG. 7 is a sectional view along line VII-VII of FIG. 6, showing the physical quantity sensor 200 of FIG. 6, FIG. 8 is a sectional view along line VIII-VIII of FIG. 6, showing the physical quantity sensor 200 of FIG. 6, and FIG. 9 is a sectional view along line IX-IX of FIG. 6, showing the physical quantity sensor 200 of FIG. 6.

In addition, for convenience, in FIG. 6, illustration is made to see through a lid body 580. Further, in FIGS. 8 and 9, illustration is made with the lid body 580 omitted. Further, in FIGS. 6 to 9, as three axes orthogonal to each other, the X-axis, the Y-axis, and the Z-axis are shown.

The physical quantity sensor 200 includes a substrate 510, a movable section 520, connection portions 530 and 532, a support section 540, fixed electrodes 550 and 552, dummy electrodes 553, 554, and 555, wiring 560, 564, and 566, pads 570, 572, and 574, and the lid body 580, as shown in FIGS. 6 to 9.

In addition, in this embodiment, an example will be described in which the physical quantity sensor 200 is an acceleration sensor (a capacitance type MEMS acceleration sensor) which detects acceleration in the vertical direction (the Z-axis direction).

Hereinafter, the respective sections configuring the physical quantity sensor 200 will be sequentially described in detail.

A material of the substrate 510 is, for example, an insulating material such as glass. For example, the substrate 510 is made of an insulating material such as glass and the movable section 520 is made of a semiconductor material such as silicon, whereby the two can be easily electrically insulated from each other, and thus it is possible to simplify a sensor structure. In addition, in a case where the substrate 510 is configured with glass, it is possible to provide a more sensitive physical quantity sensor.

A concave portion 511 is formed in the substrate 510. The movable section 520 and the connection portions 530 and 532 are provided above the concave portion 511 with a gap interposed therebetween. In the example shown in FIG. 6, the planar shape (the shape as viewed from the Z-axis direction) of the concave portion 511 is a rectangular shape. A post portion 513 is provided on a bottom surface (the surface of the substrate 510 defining the concave portion 511) 512 of the concave portion 511.

In the example shown in FIGS. 7 to 9, the post portion 513 is provided integrally with the substrate 510. The post portion 513 protrudes further upward (in the +Z-axis direction) than the bottom surface 512.

As shown in FIGS. 8 and 9, in this embodiment, the height of the post portion 513 (the distance between an upper surface 514 of the post portion 513 and the bottom surface 512) and the depth of the concave portion 511 are configured so as to be equal to each other.

The upper surface 514 of the post portion 513 is joined to the support section 540. A depression portion 515 is formed in the upper surface 514 of the post portion 513. The first wiring 560 is provided on a bottom surface (the surface of the post portion 513 defining the depression portion 515) 516 of the depression portion 515.

In addition, in the example shown in FIGS. 7 to 9, the side surface of the concave portion 511 (the side surface of the substrate 510 defining the concave portion 511) and the side surface of the post portion 513 are perpendicular to the bottom surface 512 of the concave portion 511. However, the side surfaces may be inclined with respect to the bottom surface 512.

The movable section 520 is deformable around a support axis (a first axis) Q. Specifically, the movable section 520 oscillates in a seesaw manner with the support axis Q which is determined by the connection portions 530 and 532 as a rotation axis (an oscillation axis), if acceleration in the vertical direction (the Z-axis direction) is applied thereto. The support axis Q is parallel to, for example, the Y-axis. In the illustrated example, the planar shape of the movable section 520 is a rectangular shape. The thickness (the size in the Z-axis direction) of the movable section 520 is constant, for example.

The movable section 520 has a first mass portion 520a and a second mass portion 520b.

The first mass portion 520a is one (a portion which is located on the right side in FIG. 6) of two portions of the movable section 520, which are partitioned by the support axis Q, when viewed in a plan view.

The second mass portion 520b is the other (a portion which is located on the left side in FIG. 6) of the two portions of the movable section 520, which are partitioned by the support axis Q, when viewed in a plan view.

In a case where acceleration in the vertical direction (for example, gravitational acceleration) is applied to the movable section 520, a rotational moment (a moment of a force) is generated in each of the first mass portion 520a and the second mass portion 520b. Here, in a case where the rotational moment (for example, the rotational moment in the clockwise direction) of the first mass portion 520a and the rotational moment (for example, the rotational moment in the counterclockwise direction) of the second mass portion 520b are balanced, a change does not occur in the inclination of the movable section 520, and thus it is not possible to detect acceleration. Therefore, the movable section 520 is designed such that when acceleration in the vertical direction is applied, the rotational moment of the first mass portion 520a and the rotational moment of the second mass portion 520b are not balanced, and thus predetermined inclination occurs in the movable section 520.

In the physical quantity sensor 200, by disposing the support axis Q at a position deviated from the center (the centroid) of the movable section 520 (by making the distances from the support axis Q to the tips of the mass portions 520a and 520b different from each other), the mass portions 520a and 520b have masses different from each other. That is, in the movable section 520, masses are different on one side (the first mass portion 520a) and the other side (the second mass portion 520b) with the support axis Q as a boundary. In the illustrated example, the distance from the support axis Q to an end face 523 of the first mass portion 520a is shorter than the distance from the support axis Q to an end face 524 of the second mass portion 520b. Further, the thickness of the first mass portion 520a and the thickness of the second mass portion 520b are the same. Therefore, the mass of the first mass portion 520a is smaller than the mass of the second mass portion 520b. In this manner, the mass portions 520a and 520b have masses different from each other, whereby when acceleration in the vertical direction is applied, it is possible to make the rotational moment of the first mass portion 520a and the rotational moment of the second mass portion 520b not be balanced. Therefore, when acceleration in the vertical direction is applied, it is possible to make predetermined inclination occur in the movable section 520.

The movable section 520 is provided to be spaced apart from the substrate 510. The movable section 520 is provided above the concave portion 511. In the illustrated example, a gap is provided between the movable section 520 and the substrate 510. Further, the movable section 520 is provided to be spaced apart from the support section 540 by the connection portions 530 and 532. In this way, the movable section 520 can oscillate in a seesaw manner.

The movable section 520 is provided with a first movable electrode 521 and a second movable electrode 522 provided with the support axis Q as a boundary. The first movable electrode 521 is provided in the first mass portion 520a. The second movable electrode 522 is provided in the second mass portion 520b.

The first movable electrode 521 is a portion overlapping the first fixed electrode 550 when viewed in a plan view, of the movable section 520. The first movable electrode 521 forms capacitance C1 between itself and the first fixed electrode 550. That is, the capacitance C1 is formed by the first movable electrode 521 and the first fixed electrode 550.

The second movable electrode 522 is a portion overlapping the second fixed electrode 552 when viewed in a plan view, of the movable section 520. The second movable electrode 522 forms capacitance C2 between itself and the second fixed electrode 552. That is, the capacitance C2 is formed by the second movable electrode 522 and the second fixed electrode 552. In the physical quantity sensor 200, the movable section 520 is configured with an electrically-conductive material (silicon doped with impurities), whereby the movable electrodes 521 and 522 are provided. That is, the first mass portion 520a functions as the first movable electrode 521, and the second mass portion 520b functions as the second movable electrode 522.

The capacitance C1 and the capacitance C2 are configured so as to become equal to each other, for example, in a state where the movable section 520 shown in FIG. 7 is horizontal. The positions of the movable electrodes 521 and 522 change according to the movement of the movable section 520. The capacitance C1 and the capacitance C2 change according to the positions of the movable electrodes 521 and 522. A predetermined potential is provided to the movable section 520 through the connection portions 530 and 532 and the support section 540.

A through-hole 525 passing through the movable section 520 is formed in the movable section 520. In this way, it is possible to reduce the influence of air (resistance of air) when the movable section 520 oscillates. The through-hole 525 is formed, for example, in a plurality. In the illustrated example, the planar shape of the through-hole 525 is a rectangular shape.

An opening portion 526 passing through the movable section 520 is provided in the movable section 520. The opening portion 526 is provided on the support axis Q when viewed in a plan view. The connection portions 530 and 532 and the support section 540 are provided in the opening portion 526. In the illustrated example, the planar shape of the opening portion 526 is a rectangular shape. The movable section 520 is connected to the support section 540 through the connection portions 530 and 532.

The connection portions 530 and 532 connect the movable section 520 and the support section 540. The connection portions 530 and 532 function as torsion springs. In this way, the connection portions 530 and 532 can have strong resilience against torsional deformation occurring in the connection portions 530 and 532 due to the seesaw oscillation of the movable section 520.

The connection portions 530 and 532 are disposed on the support axis Q when viewed in a plan view. The connection portions 530 and 532 extend along the support axis Q. The first connection portion 530 extends in the +Y-axis direction from the support section 540. The second connection portion 532 extends in the −Y-axis direction from the support section 540.

The support section 540 is disposed in the opening portion 526. The support section 540 is provided on the support axis Q when viewed in a plan view. A portion of the support section 540 is joined (connected) to the upper surface 514 of the post portion 513. The support section 540 supports the movable section 520 through the connection portions 530 and 532. A connection area 546 to which the connection portions 530 and 532 are connected and which is provided along the support axis Q, and a contact area 563 which is provided on the outside of the connection area 546 when viewed in a plan view and is electrically connected to the first wiring 560 provided on the substrate are provided in the support section 540.

The support section 540 has a first portion 541 and second portions 542, 543, 544, and 545. The support section 540 has a shape in which the first portion 541 extends along a second axis R intersecting (specifically, orthogonal to) the support axis Q and the second portions 542, 543, 544, and 545 protrude from end portions of the first portion 541. The second axis R is an axis parallel to the X-axis.

The first portion 541 of the support section 540 extends to intersect (specifically, to be orthogonal to) the support axis Q. The connection portions 530 and 532 are joined to the first portion 541. The first portion 541 is provided on the support axis Q when viewed in a plan view and is spaced apart from the substrate 510. That is, a portion on the support axis Q, of the support section 540, is spaced apart from the substrate 510. In the example shown in FIG. 6, the planar shape of the first portion 541 is a rectangular shape. The first portion 541 extends along the second axis R.

The connection area 546 is provided in the first portion 541 of the support section 540. In the example shown in FIG. 6, the connection area 546 is an area sandwiched between the connection portions 530 and 532, of the support section 540 when viewed in a plan view. In the illustrated example, the planar shape of the connection area 546 is a rectangular shape. At least a portion of the connection area 546 is not fixed to the substrate 510.

The second portions 542, 543, 544, and 545 of the support section 540 protrude (extend) from the end portions of the first portion 541. In the example shown in FIG. 6, the planar shape of each of the second portions 542, 543, 544, and 545 is a rectangular shape. The contact area 563 is provided in each of the second portions 542, 543, 544, and 545.

The second portions 542 and 543 of the support section 540 extend in the opposite directions to each other along the support axis Q from the end portion on one side (specifically, the end portion in the −X-axis direction) of the first portion 541. In the illustrated example, the second portion 542 extends in the +Y-axis direction from the end portion on one side of the first portion 541. The second portion 543 extends in the −Y-axis direction from the end portion on one side of the first portion 541. A portion of the second portion 542 and a portion of the second portion 543 are joined to the post portion 513.

The second portions 544 and 545 of the support section 540 extend in the opposite directions to each other along the support axis Q from the end portion on the other side (specifically, the end portion in the +X-axis direction) of the first portion 541. In the illustrated example, the second portion 544 extends in the +Y-axis direction from the end portion on the other side of the first portion 541. The second portion 545 extends in the −Y-axis direction from the end portion on the other side of the first portion 541. A portion of the second portion 544 and a portion of the second portion 545 are joined to the post portion 513.

The support section 540 is provided with the portions 541, 542, 543, 544, and 545 as described above, thereby having a H-shaped (substantially H-shaped) planar shape. That is, the first portion 541 configures the crossbar of the H-shape. The second portions 542, 543, 544, and 545 configure the vertical bars of the H-shape.

The movable section 520, the connection portions 530 and 532, and the support section 540 are provided in an integrated fashion. In the illustrated example, the movable section 520, the connection portions 530 and 532, and the support section 540 configure a single structural body (silicon structural body) 502. The movable section 520, the connection portions 530 and 532, and the support section 540 are provided in an integrated fashion by patterning a single substrate (silicon substrate). Materials of the movable section 520, the connection portions 530 and 532, and the support section 540 are silicon with electrical conductivity given thereto by doping of impurities such as phosphorus or boron, for example. In a case where the material of the substrate 510 is glass and the materials of the movable section 520, the connection portions 530 and 532, and the support section 540 are silicon, the substrate 510 and the support section 540 are joined to each other by, for example, anodic bonding.

In the physical quantity sensor 200, the structural body 502 is fixed to the substrate 510 by a single support section 540. That is, the structural body 502 is fixed to the substrate 510 at one point (the single support section 540). Therefore, compared to, for example, a form in which a structural body is fixed to a substrate at two points (two support sections), it is possible to reduce the influence on the connection portions 530 and 532 of stress occurring due to a difference between the coefficient of thermal expansion of the substrate 510 and the coefficient of thermal expansion of the structural body 502, stress which is applied to a device at the time of packaging, or the like.

The fixed electrodes 550 and 552 are provided on the substrate 510. In the illustrated example, the fixed electrodes 550 and 552 are provided on the bottom surface 512 of the concave portion 511. The first fixed electrode 550 is disposed to face the first movable electrode 521. The first movable electrode 521 is located above the first fixed electrode 550 with a gap interposed therebetween. The second fixed electrode 552 is disposed to face the second movable electrode 522. The second movable electrode 522 is located above the second fixed electrode 552 with a gap interposed therebetween. The area of the first fixed electrode 550 and the area of the second fixed electrode 552 are, for example, the same. The planar shape of the first fixed electrode 550 and the planar shape of the second fixed electrode 552 are symmetrical with respect to the support axis Q, for example.

The dummy electrodes 553, 554, and 555 are provided on the substrate 510 so as not to come into contact with the fixed electrodes 550 and 552. The dummy electrodes 553, 554, and 555 are configured so as to have the same potential as the potential of the movable section 520. By disposing the dummy electrodes 553, 554, and 555, it is possible to reduce the size of a glass exposed surface facing the structural body 502, and therefore, it is possible to reduce an electrostatic force which is generated during anodic bonding, and thus it is possible to effectively suppress the sticking of the structural body 502 to the substrate 510.

The first dummy electrode 553 is provided between the first fixed electrode 550 and the second fixed electrode 552. Further, the second dummy electrode 554 is provided on the side opposite to the first dummy electrode 553, of the first fixed electrode 550. Further, the third dummy electrode 555 is provided on the side opposite to the first dummy electrode 553, of the second fixed electrode 552.

Incidentally, in general, in a case where the widths in the Y-axis direction of a fixed electrode and a dummy electrode are the same, when the capacitance between the first fixed electrode 550 and the second dummy electrode 554 is set to be C6 and the capacitance between the second fixed electrode 552 and the third dummy electrode 555 is set to be C7, a relationship of C6<C7 is established, and therefore, if the difference between capacity which is formed by the movable section 520 and the first fixed electrode 550 and capacity which is formed by the movable section 520 and the second fixed electrode 552 is taken, a capacity offset corresponding to the difference between C6 and C7 occurs.

In contrast, in this embodiment, a configuration is made such that the width (the width in the Y-axis direction) of the second dummy electrode 554 is larger than the width (the width in the Y-axis direction) of the second fixed electrode 552. With such a configuration, it is possible to increase C6. As a result, it is possible to effectively reduce the difference between C6 and C7, and thus it is possible to reduce a capacity offset.

Materials of the fixed electrodes 550 and 552 and the dummy electrodes 553, 554, and 555 are, for example, aluminum, gold, or ITO (Indium Tin Oxide). It is preferable that the materials of the fixed electrodes 550 and 552 and the dummy electrodes 553, 554, and 555 are a transparent electrode material such as ITO. This is because a transparent electrode material is used as the fixed electrodes 550 and 552 and the dummy electrodes 553, 554, and 555, whereby in a case where the substrate 510 is a transparent substrate (a glass substrate), it is possible to easily visually recognize foreign matter or the like existing on the fixed electrodes 550 and 552 and the dummy electrodes 553, 554, and 555.

The first wiring 560 is provided on the substrate 510. The first wiring 560 has a wiring layer portion 561 and a bump portion 562.

The wiring layer portion 561 of the first wiring 560 connects the first pad 570 and the bump portion 562. In the illustrated example, the wiring layer portion 561 extends from the first pad 570 to the bump portion 562 through a first groove portion 517 formed in the substrate 510, the concave portion 511, and the depression portion 515. A portion provided in the depression portion 515, of the wiring layer portion 561, overlaps the support section 540 when viewed in a plan view. In the illustrated example, the planar shape of the portion provided in the depression portion 515, of the wiring layer portion 561, is an H-shape (a substantially H-shape). A material of the wiring layer portion 561 is the same as the material of the fixed electrodes 550 and 552, for example.

The bump portion 562 of the first wiring 560 is provided on the wiring layer portion 561. The bump portion 562 connects the wiring layer portion 561 and the support section 540 at the contact area 563. That is, the contact area 563 is an area where the first wiring 560 and the support section 540 are connected (are in contact with each other). More specifically, the contact area 563 is an area (a contact surface) which is in contact with the support section 540, of the bump portion 562. A material of the bump portion 562 is, for example, aluminum, gold, or platinum.

The contact area 563 is disposed to avoid the support axis Q. That is, the contact area 563 is disposed to be spaced apart from the support axis Q. At least one contact area 563 is provided for each of one side (specifically, the +X-axis direction side) and the other side (specifically, the −X-axis direction side) with the support axis Q as a boundary, when viewed in a plan view. The contact areas 563 are provided on both sides of the connection area 546 with the support axis Q as a boundary, when viewed in a plan view. In the illustrated example, four contact areas 563 are provided so as to overlap the second portions 542, 543, 544, and 545 of the support section 540 when viewed in a plan view. That is, the contact area 563 is provided to overlap each of end portions of the vertical bars of the support section 540 having an H-shape (a substantially H-shape) when viewed in a plan view. In the illustrated example, the planar shape of each of the contact areas 563 is a rectangular shape.

The contact area 563 is located further toward the upper side than the upper surface (the joint surface between the post portion 513 and the support section 540) 514 of the post portion 513, as shown in FIGS. 8 and 9. Specifically, when joining a silicon substrate to the substrate 510 (details will be described later), the silicon substrate is depressed by being pushed by the bump portion 562 of the first wiring 560, and thus the contact area 563 is located further toward the upper side than the upper surface 514 of the post portion 513. For example, the support section 540 (the silicon substrate) is pushed by the bump portion 562, whereby stress occurs in the support section 540.

In addition, although not shown in the drawings, if the first wiring 560 and the support section 540 are in contact with each other, the support section 540 is not depressed and the contact area 563 and the upper surface 514 of the post portion 513 may be at the same position in the Z-axis direction. That is, the contact area 563 and the upper surface 514 may have the same height. Also in such a form, the first wiring 560 and the support section 540 come into contact with each other, whereby stress occurs in the support section 540.

Further, although not shown in the drawings, each of the dummy electrodes 553, 554, and 555 is connected to the first wiring 560, thereby having the same potential as the potential of the movable section 520.

The second wiring 564 is provided on the substrate 510. The second wiring 564 connects the second pad 572 and the first fixed electrode 550. In the illustrated example, the second wiring 564 extends from the second pad 572 to the first fixed electrode 550 through a second groove portion 518 and the concave portion 511. A material of the second wiring 564 is the same as the materials of the fixed electrodes 550 and 552, for example.

The third wiring 566 is provided on the substrate 510. The third wiring 566 connects the third pad 574 and the second fixed electrode 552. In the illustrated example, the third wiring 566 extends from the third pad 574 to the second fixed electrode 552 through a third groove portion 519 and the concave portion 511. A material of the third wiring 566 is the same as the materials of the fixed electrodes 550 and 552, for example.

The pads 570, 572, and 574 are provided on the substrate 510. In the illustrated example, the pads 570, 572, and 574 are respectively provided in the groove portions 517, 518, and 519 and connected to the wirings 560, 564, and 566. The pads 570, 572, and 574 are provided at positions which do not overlap the lid body 580 when viewed in a plan view. In this way, even in a state where the movable section 520 is accommodated in the substrate 510 and the lid body 580, it is possible to detect the capacitance C1 and C2 by the pads 570, 572, and 574. Materials of the pads 570, 572, and 574 are the same as the materials of the fixed electrodes 550 and 552, for example.

The lid body 580 is provided on the substrate 510. The lid body 580 is joined to the substrate 510. The lid body 580 and the substrate 510 form a cavity 582 which accommodates the movable section 520. The cavity 582 has, for example, an inert gas (for example, nitrogen gas) atmosphere. A material of the lid body 580 is, for example, silicon. In a case where the material of the lid body 580 is silicon and the material of the substrate 510 is glass, the substrate 510 and the lid body 580 are joined to each other by, for example, anodic bonding.

Next, an operation of the physical quantity sensor 200 will be described.

In the physical quantity sensor 200, the movable section 520 oscillates around the support axis Q according to a physical quantity such as acceleration or angular velocity. The distance between the first movable electrode 521 and the first fixed electrode 550 and the distance between the second movable electrode 522 and the second fixed electrode 552 change according to the movement of the movable section 520. Specifically, if, for example, vertical upward (+Z-axis direction) acceleration is applied to the physical quantity sensor 200, the movable section 520 rotates in the counterclockwise direction, and thus the distance between the first movable electrode 521 and the first fixed electrode 550 becomes smaller and the distance between the second movable electrode 522 and the second fixed electrode 552 becomes larger. As a result, the capacitance C1 becomes larger and the capacitance C2 becomes smaller. Further, if, for example, vertical downward (−Z-axis direction) acceleration is applied to the physical quantity sensor 200, the movable section 520 rotates in the clockwise direction, and thus the distance between the first movable electrode 521 and the first fixed electrode 550 becomes larger and the distance between the second movable electrode 522 and the second fixed electrode 552 becomes smaller. As a result, the capacitance C1 becomes smaller and the capacitance C2 becomes larger.

In the physical quantity sensor 200, the capacitance C1 is detected by using the pads 570 and 572, and the capacitance C2 is detected by using the pads 570 and 574. Then, a physical quantity such as the direction or the magnitude of acceleration, angular velocity, or the like can be detected based on the difference between the capacitance C1 and the capacitance C2 (by a so-called differential detection method).

As described above, the physical quantity sensor 200 can be used as an inertial sensor such as an acceleration sensor or a gyro sensor and specifically, can be used as a capacitance type acceleration sensor for measuring, for example, acceleration in the vertical direction (the Z-axis direction).

In the physical quantity sensor 200 described above, the fixed electrodes 550 and 552 and the dummy electrodes 553, 554, and 555 are disposed such that a capacity offset becomes smaller than a capacity offset in a case where the distances between the first fixed electrode 550 and the first and second dummy electrodes 553 and 554 and the distances between the second fixed electrode 552 and the first and third dummy electrodes 553 and 555 are the same.

With such a configuration, it is possible to prevent the occurrence of the sticking and reduce the capacity offset.

More specifically, for example, when the distance between the first fixed electrode 550 and the first dummy electrode 553 is set to be w1, the distance between the second fixed electrode 552 and the first dummy electrode 553 is set to be w2, the distance between the first fixed electrode 550 and the second dummy electrode 554 is set to be w3, and the distance between the second fixed electrode 552 and the third dummy electrode 555 is set to be w4, a configuration is made such that a relationship of w1<w2 and w3=w4 is established.

With such a configuration, when the capacitance between the first fixed electrode 550 and the first dummy electrode 553 is set to be C4, the capacitance between the second fixed electrode 552 and the first dummy electrode 553 is set to be C5, the capacitance between the first fixed electrode 550 and the second dummy electrode 554 is set to be C6, and the capacitance between the second fixed electrode 552 and the third dummy electrode 555 is set to be C7, a relationship of C4=C5 and C6>C7 is established, and thus it is possible to further reduce the capacity offset.

Further, for example, a configuration is made such that a relationship of w1<w2 and w3=w4 is established, whereby even if a relationship of C6<C7 is established, by making a relationship of C4>C5 be established, it is possible to further reduce the capacity offset.

Further, for example, by making a configuration such that a relationship of w1<w2 and w3<w4 is established, a relationship of C4>C5 and C6>C7 is established, and thus it is possible to further reduce the capacity offset.

Further, for example, in a case of narrowing w1, by making a configuration such that a relationship of w1<w2 and w3>w4 is established, a relationship of C4>>C5 and C6<C7 is established, and thus it is possible to further reduce the capacity offset.

Further, for example, in a case of narrowing w3, by making a configuration such that a relationship of w1>w2 and w3<w4 is established, a relationship of C4<C5 and C6>>C7 is established, and thus it is possible to further reduce the capacity offset.

Further, in the physical quantity sensor 200 having the configuration as described above, the dummy electrodes 553, 554, and 555 are not formed in a sensor area (an area where capacitance changes), and therefore, there is no concern that accuracy may be reduced due to the occurrence of variation in measurement, or the like.

Method of Manufacturing Physical Quantity Sensor

Figure 10:
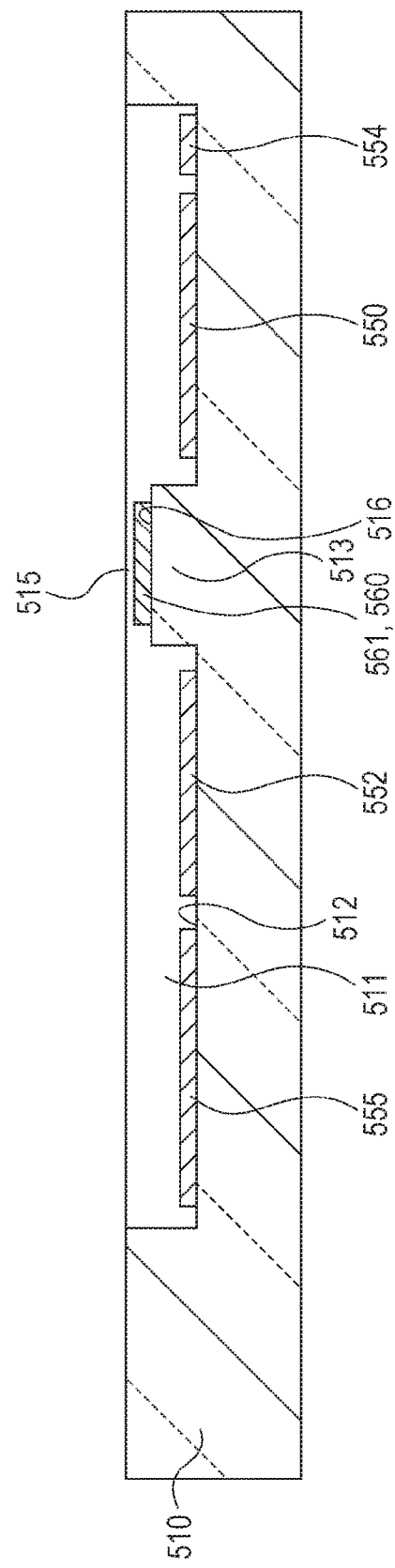
FIG. 10 is a sectional view showing a process of manufacturing the physical quantity sensor of FIG. 6.
Figure 11:
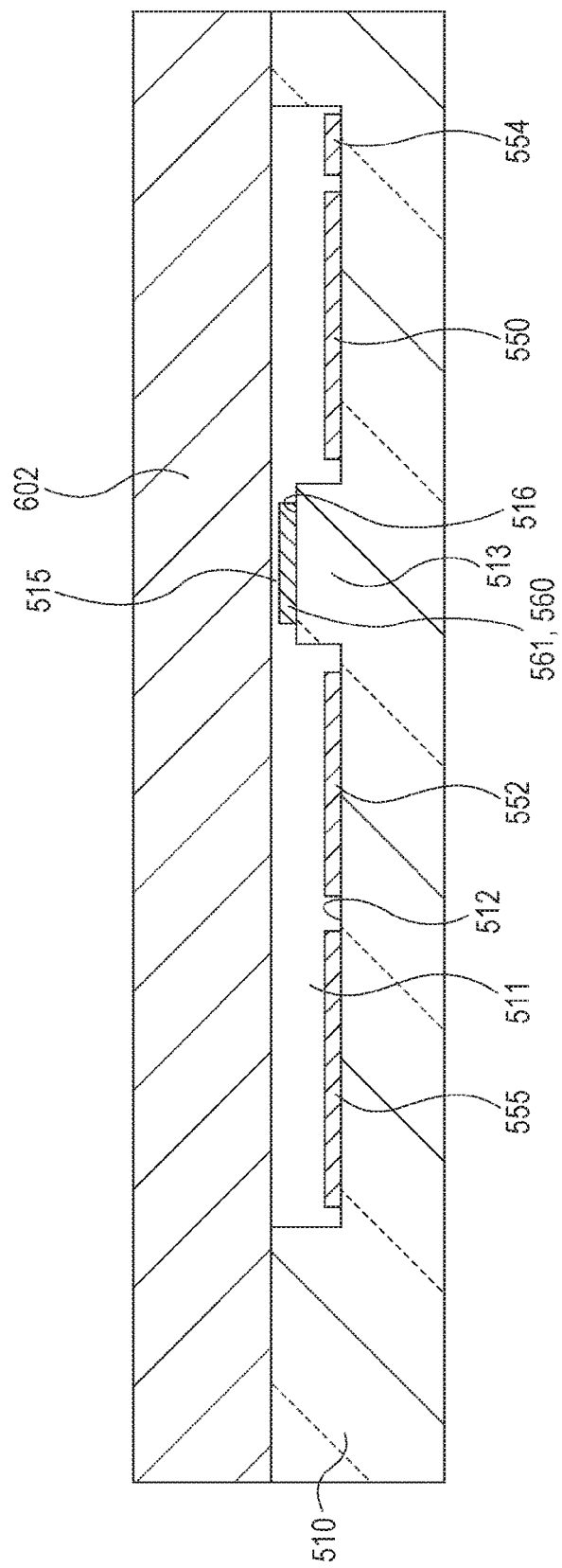
FIG. 11 is a sectional view showing the process of manufacturing the physical quantity sensor of FIG. 6.
Figure 12:
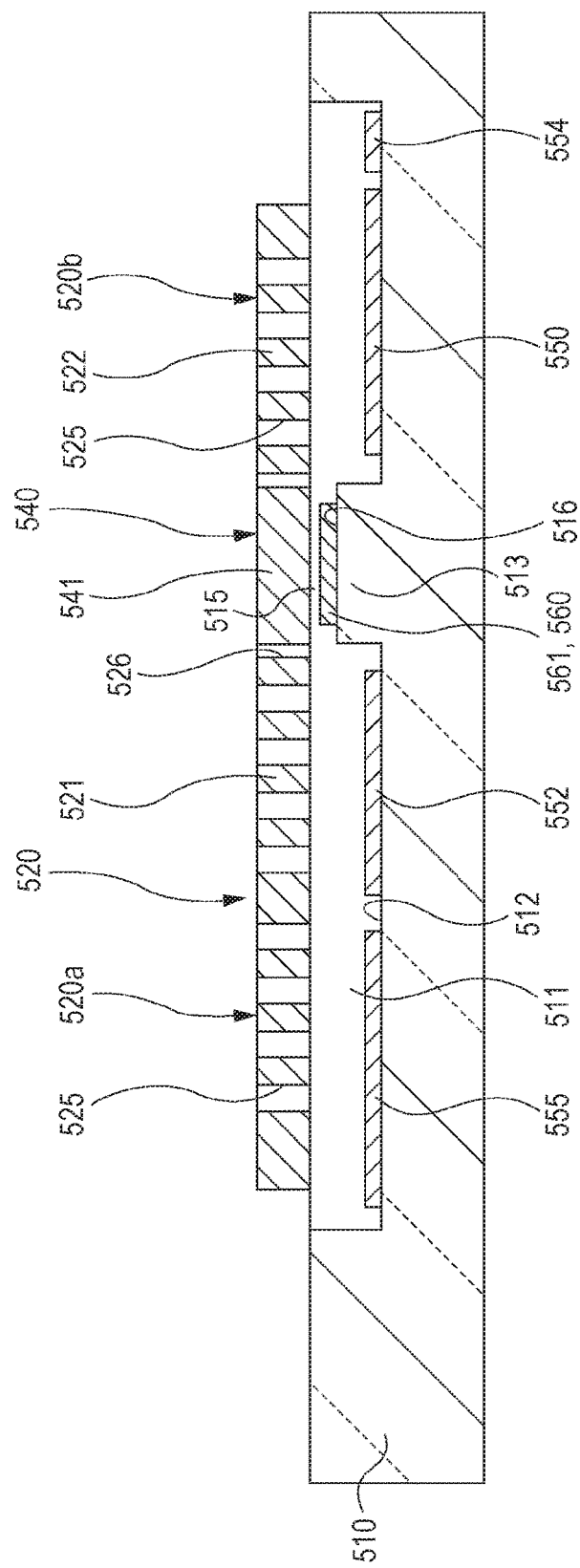
FIG. 12 is a sectional view showing the process of manufacturing the physical quantity sensor of FIG. 6.

Next, a method of manufacturing the physical quantity sensor of FIG. 6 will be described with reference to the drawings. FIGS. 10 to 12 are sectional views showing a process of manufacturing the physical quantity sensor 200 of FIG. 6 and correspond to FIG. 7.

As shown in FIG. 10, the concave portion 511, the post portion 513 with the depression portion 515 formed therein, and the groove portions 517, 518, and 519 (refer to FIG. 6) are formed by patterning, for example, a glass substrate. The patterning is performed by, for example, photolithography and etching. By this process, it is possible to obtain the substrate 510 with the concave portion 511, the post portion 513, and the groove portions 517, 518, and 519 formed therein.

Next, the fixed electrodes 550 and 552 and the dummy electrodes 553, 554, and 555 are formed on the bottom surface 512 of the concave portion 511. Next, the wiring layer portion 561 and the wirings 564 and 566 are formed on the substrate 510 (refer to FIG. 6). The wirings 564 and 566 are respectively formed so as to be connected to the fixed electrodes 550 and 552. Next, the bump portion 562 is formed on the wiring layer portion 561 (refer to FIGS. 8 and 9). In this way, it is possible to form the first wiring 560. The bump portion 562 is formed such that the upper surface thereof is located further toward the upper side than the upper surface 514 of the post portion 513. Next, the pads 570, 572, and 574 are respectively formed so as to be connected to the wirings 560, 564, and 566 (refer to FIG. 6).

The fixed electrodes 550 and 552, the wirings 560, 564, and 566, and the pads 570, 572, and 574 are formed by film formation by, for example, a sputtering method or a CVD (Chemical Vapor Deposition) method, and patterning. The patterning is performed by, for example, photolithography and etching.

As shown in FIG. 11, for example, a silicon substrate 602 is joined to the substrate 510. The joining of the substrate 510 and the silicon substrate 602 is performed by, for example, anodic bonding. In this way, the substrate 510 and the silicon substrate 602 can be solidly joined to each other. In addition, at the time of the anodic bonding, the silicon substrate 602 and the dummy electrodes 553, 554, and 555 have the same potential, and therefore, the sticking of the silicon substrate 602 to the substrate 510 is effectively suppressed. Further, when joining the silicon substrate 602 to the substrate 510, the silicon substrate 602 is depressed by being pushed by the bump portion 562 of the first wiring 560, for example (refer to FIGS. 8 and 9). In this way, stress occurs in the silicon substrate 602.

As shown in FIG. 12, after the silicon substrate 602 is thinned by grinding by, for example, a grinder, the silicon substrate 602 is patterned into a predetermined shape, and thus the movable section 520, the connection portions 530 and 532, and the support section 540 are formed in an integrated fashion. The patterning is performed by photolithography and etching (dry etching), and as a more specific etching technique, it is possible to use a Bosch method.

As shown in FIG. 7, the lid body 580 is joined to the substrate 510, and thus the movable section 520 and the like are accommodated in the cavity 582 which is formed by the substrate 510 and the lid body 580. The joining of the substrate 510 and the lid body 580 is performed by, for example, anodic bonding. In this way, the substrate 510 and the lid body 580 can be solidly joined to each other. This process is performed in an inert gas atmosphere, whereby the cavity 582 can be filled with inert gas.

Through the above processes, it is possible to manufacture the physical quantity sensor 200.

Figure 13:
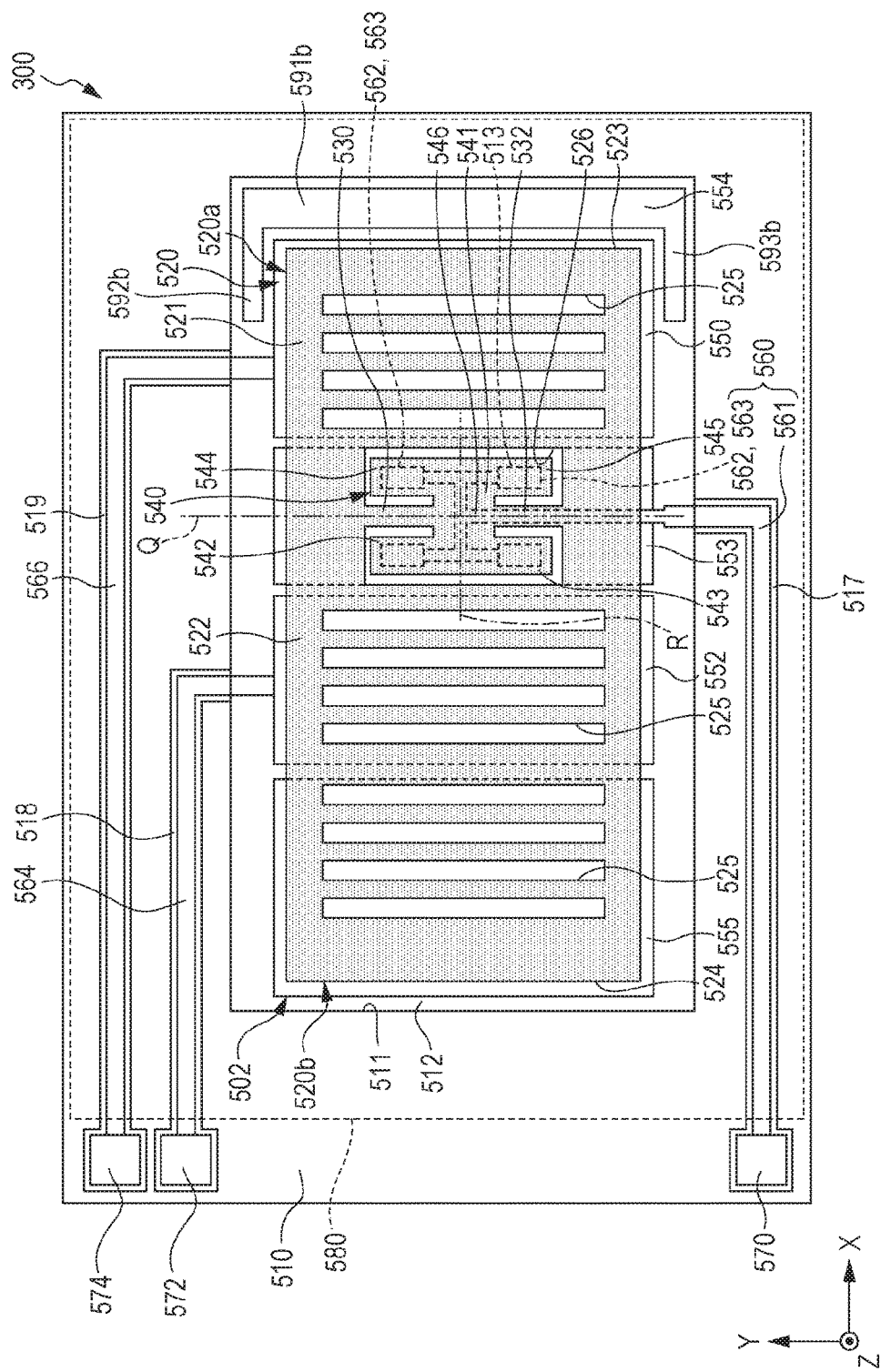
FIG. 13 is a plan view showing a physical quantity sensor according to a preferred embodiment of the invention.

Further, FIG. 13 is a plan view showing a physical quantity sensor according to a preferred embodiment of the invention. As shown in FIG. 13, in a physical quantity sensor 300, the second dummy electrode 554 may have a shape in which the second dummy electrode 554 wraps around the sides of both end portions in a width direction of the first fixed electrode 550. Specifically, the second dummy electrode 554 is formed in a C-shape having a base portion 591b which is located on the +X-axis side of the first fixed electrode 550 and extends in the Y-axis direction, a protrusion portion 592b which is located on the +Y-axis side of the first fixed electrode 550 and protrudes from an end portion on the +Y-axis side of the base portion 591b to the −X-axis side, and a protrusion portion 593b which is located on the −Y-axis side of the first fixed electrode 550 and protrudes in the −X-axis direction from an end portion on the −Y-axis side of the base portion 591b. The protrusion portions 592b and 593b are respectively provided alongside (to face) the first fixed electrode 550 in the Y-axis direction and are disposed to face each other with the first fixed electrode 550 interposed therebetween.

With such a shape, a portion facing the first fixed electrode 550, of the second dummy electrode 554, increases, and therefore, it is possible to more effectively increase the capacitance C6 between the first fixed electrode 550 and the second dummy electrode 554, and thus it is possible to make the difference between C6 and C7 smaller. As a result, it is possible to further reduce the capacity offset.

Modified Example 1 of Physical Quantity Sensor

Figure 14:
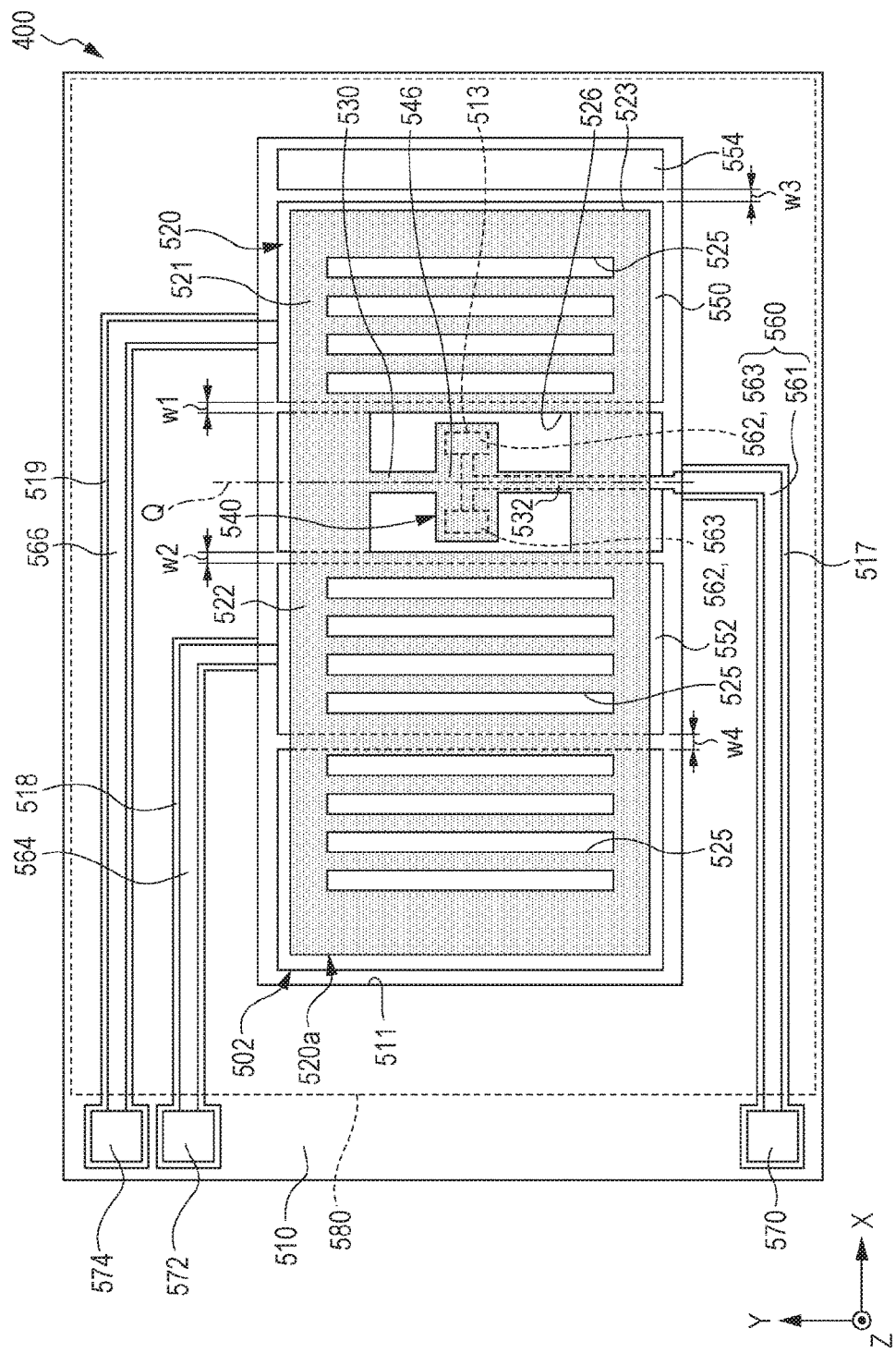
FIG. 14 is a plan view showing a physical quantity sensor according to Modified Example 1.

Next, a physical quantity sensor according to a modified example of the physical quantity sensor 200 will be described with reference to the drawing. FIG. 14 is a plan view showing a physical quantity sensor 400 according to the modified example. In addition, for convenience, in FIG. 14, illustration is made to see through the lid body 580. Further, in FIG. 14, as three axes orthogonal to each other, the X-axis, the Y-axis, and the Z-axis are shown.

Hereinafter, in the physical quantity sensor 400 according to the modified example, members having the same function as the constituent members of the physical quantity sensor 200 of FIG. 6 are denoted by the same reference numerals and a detailed description thereof is omitted.

In the physical quantity sensor 200, as shown in FIG. 6, the planar shape of the support section 540 is an H-shape (a substantially H-shape). In contrast, in the physical quantity sensor 400, as shown in FIG. 14, the planar shape of the support section 540 is a quadrangular shape (in the illustrated example, a rectangular shape).

In the physical quantity sensor 400, one contact area 563 is provided for each of one side (specifically, the +X-axis direction side) and the other side (specifically, the −X-axis direction side) with the support axis Q as a boundary, when viewed in a plan view.

The physical quantity sensor 400 can have high reliability, similarly to the physical quantity sensor 200.

Modified Example 2 of Physical Quantity Sensor

Figure 15:
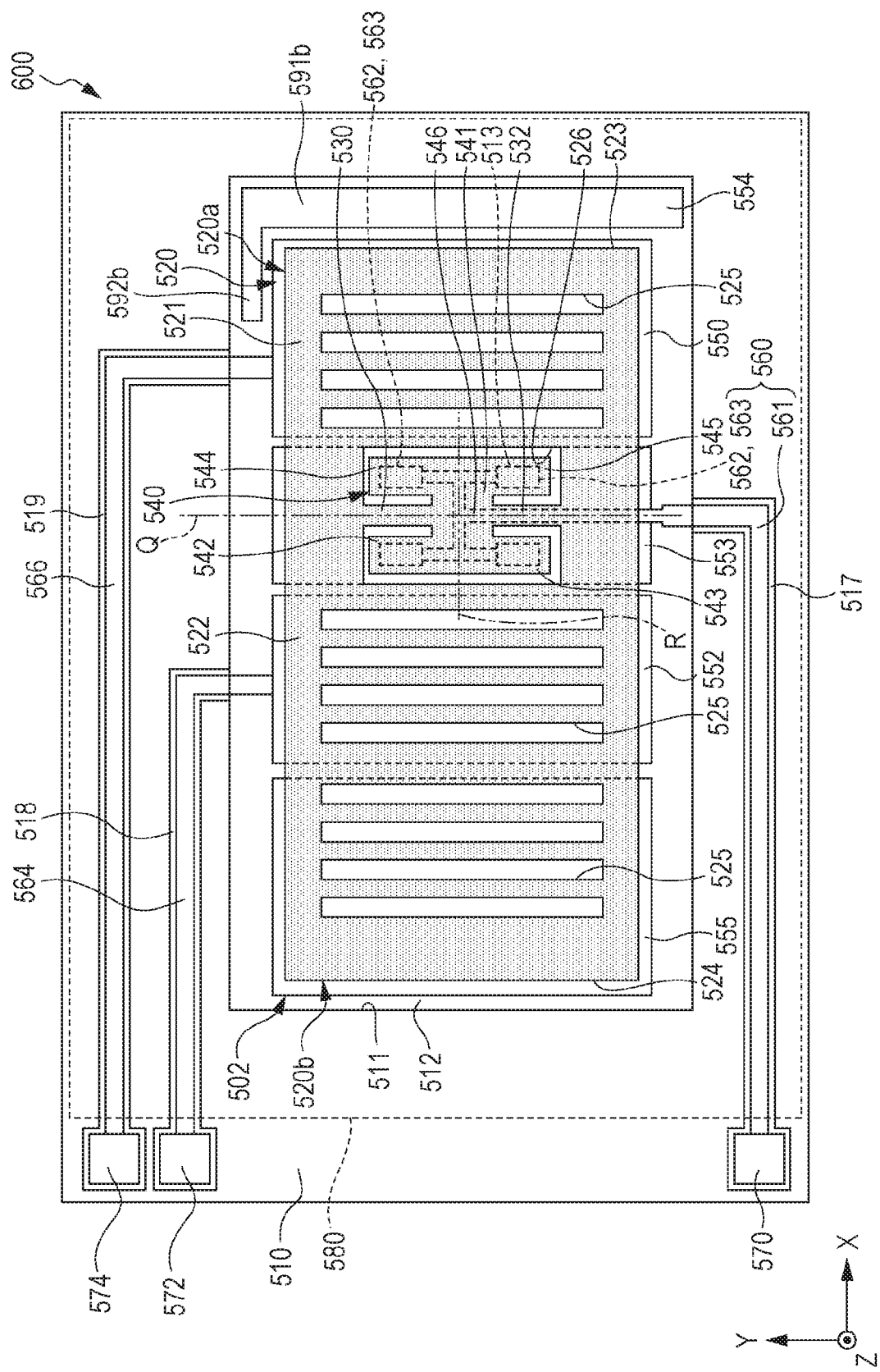
FIG. 15 is a plan view showing a physical quantity sensor according to Modified Example 2.

Next, a physical quantity sensor according to Modified Example 2 of the above-described physical quantity sensor will be described with reference to the drawing. FIG. 15 is a plan view showing a physical quantity sensor 600 according to Modified Example 2. In addition, for convenience, in FIG. 15, illustration is made to see through the lid body 580. Further, in FIG. 15, as three axes orthogonal to each other, the X-axis, the Y-axis, and the Z-axis are shown.

Hereinafter, in the physical quantity sensor 600 according to the modified example, members having the same function as the constituent members of the physical quantity sensor 300 of FIG. 13 are denoted by the same reference numerals and a detailed description thereof is omitted.

In the physical quantity sensor 300, as shown in FIG. 13, the second dummy electrode 554 has a shape in which the second dummy electrode 554 wraps around the sides of both end portions in the width direction of the first fixed electrode 550. In contrast, in the physical quantity sensor 600, as shown in FIG. 15, the second dummy electrode 554 has a shape in which the second dummy electrode 554 wraps around only the side of the end portion on one side in the width direction of the first fixed electrode 550. Specifically, the second dummy electrode 554 is formed in an L-shape having the base portion 591b which is located on the +X-axis side of the first fixed electrode 550 and extends in the Y-axis direction, and the protrusion portion 592b which is located on the +Y-axis side of the first fixed electrode 550 and protrudes in the −X-axis direction from the end portion on the +Y-axis side of the base portion 591b.

In the physical quantity sensor 600, similarly to the physical quantity sensor 300, it is possible to reduce the capacity offset, and thus the physical quantity sensor 600 can have high reliability.

Modified Example 3 of Physical Quantity Sensor

Figure 16:
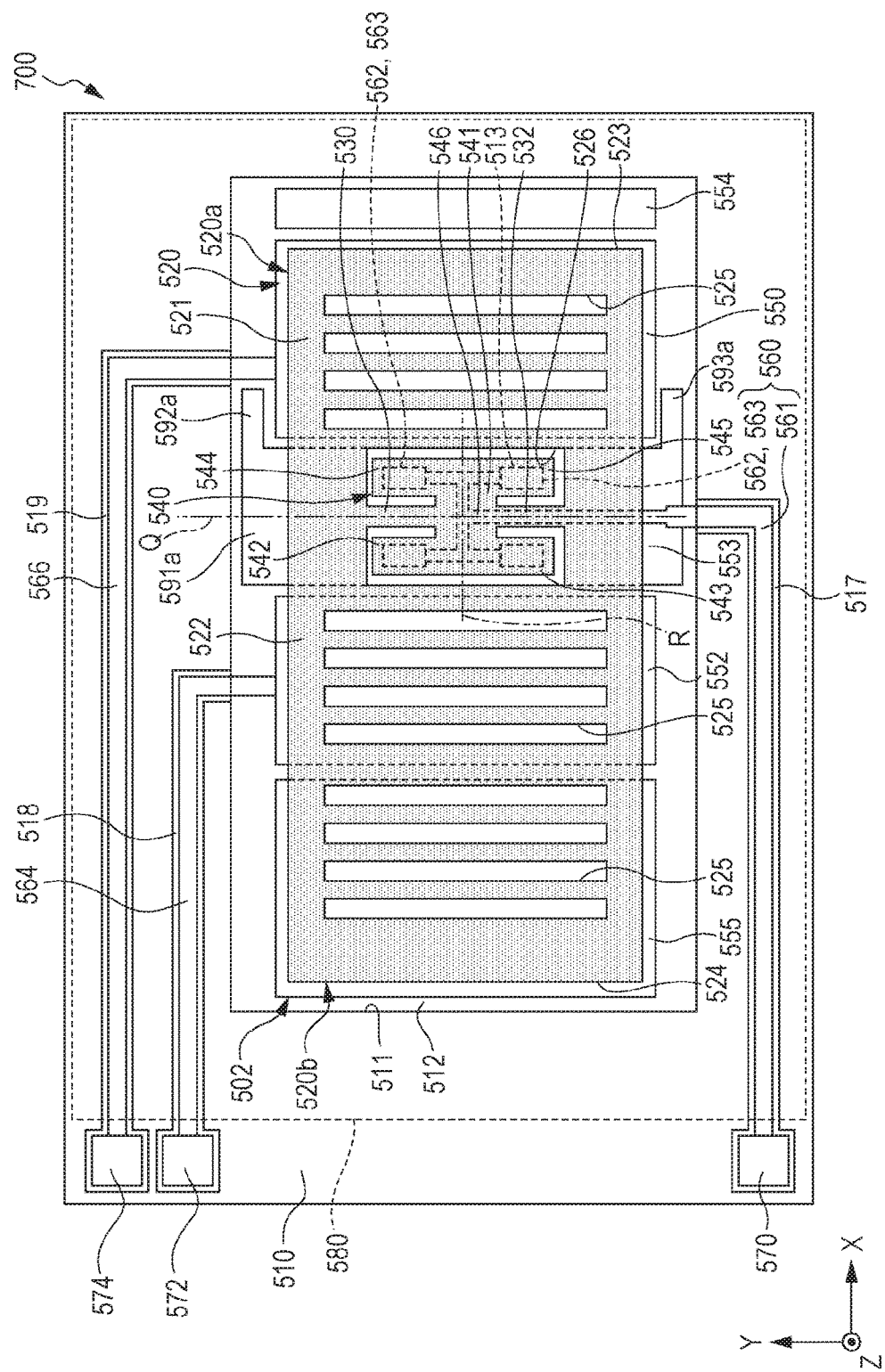
FIG. 16 is a plan view showing a physical quantity sensor according to Modified Example 3.

Next, a physical quantity sensor according to Modified Example 3 of the above-described physical quantity sensor will be described with reference to the drawing. FIG. 16 is a plan view showing a physical quantity sensor 700 according to Modified Example 3. In addition, for convenience, in FIG. 16, illustration is made to see through the lid body 580. Further, in FIG. 16, as three axes orthogonal to each other, the X-axis, the Y-axis, and the Z-axis are shown.

Hereinafter, in the physical quantity sensor 700 according to the modified example, members having the same function as the constituent members of the physical quantity sensor 300 of FIG. 13 are denoted by the same reference numerals and a detailed description thereof is omitted.

In the physical quantity sensor 300, as shown in FIG. 13, the second dummy electrode 554 has a shape in which the second dummy electrode 554 wraps around the sides of both end portions in the width direction of the first fixed electrode 550. In contrast, in the physical quantity sensor 700, as shown in FIG. 16, the first dummy electrode 553 has a shape in which the first dummy electrode 553 wraps around the sides of both end portions in the width direction of the first fixed electrode 550. Specifically, the first dummy electrode 553 is formed in a C-shape having a base portion 591a which is located on the −X-axis side of the first fixed electrode 550 and extends in the Y-axis direction, a protrusion portion 592a which is located on the +Y-axis side of the first fixed electrode 550 and protrudes from an end portion on the +Y-axis side of the base portion 591a to the +X-axis side, and a protrusion portion 593a which is located on the −Y-axis side of the first fixed electrode 550 and protrudes in the +X-axis direction from an end portion on the −Y-axis side of the base portion 591a. The protrusion portions 592a and 593a are respectively provided alongside (to face) the first fixed electrode 550 in the Y-axis direction and are disposed to face each other with the first fixed electrode 550 interposed therebetween.

With such a configuration, even in a relationship of (the capacitance C6 between the first fixed electrode 550 and the second dummy electrode 554)<(the capacitance C7 between the second fixed electrode 552 and the third dummy electrode 555), it is possible to make the capacitance C4 between the first fixed electrode 550 and the first dummy electrode 553 larger than the capacitance C5 between the second fixed electrode 552 and the first dummy electrode 553. As a result, it is possible to reduce the difference between capacity which is formed by the movable section 520 and the first fixed electrode 550 and capacity which is formed by the movable section 520 and the second fixed electrode 552, and thus it is possible to reduce the capacity offset.

Modified Example 4 of Physical Quantity Sensor

Figure 17:
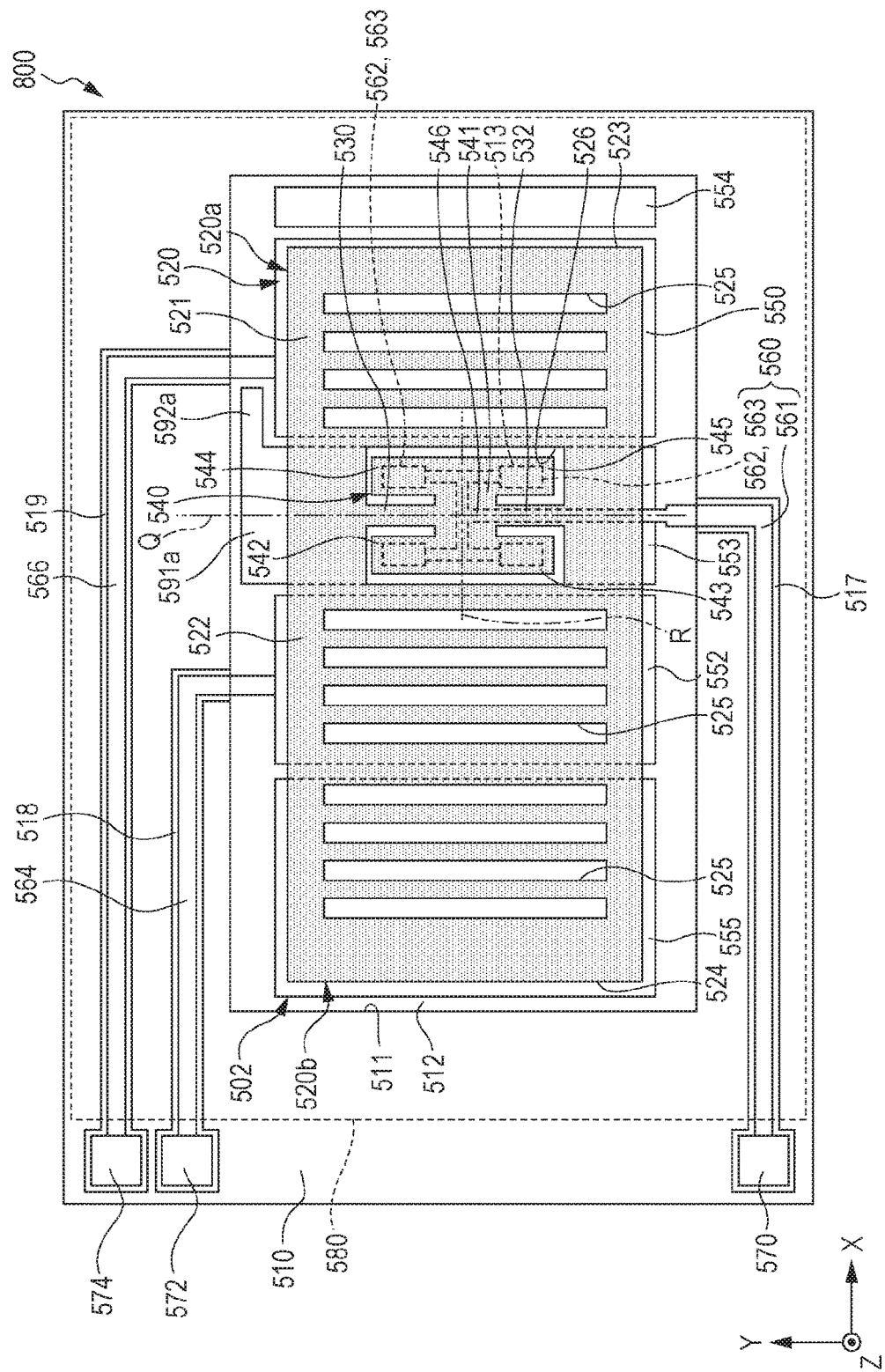
FIG. 17 is a plan view showing a physical quantity sensor according to Modified Example 4.

Next, a physical quantity sensor according to Modified Example 4 of the above-described physical quantity sensor will be described with reference to the drawing. FIG. 17 is a plan view showing a physical quantity sensor 800 according to Modified Example 4. In addition, for convenience, in FIG. 17, illustration is made to see through the lid body 580. Further, in FIG. 17, as three axes orthogonal to each other, the X-axis, the Y-axis, and the Z-axis are shown.

Hereinafter, in the physical quantity sensor 800 according to the modified example, members having the same function as the constituent members of the physical quantity sensor 700 of FIG. 16 are denoted by the same reference numerals and a detailed description thereof is omitted.

In the physical quantity sensor 700, as shown in FIG. 16, the first dummy electrode 553 has a shape in which the first dummy electrode 553 wraps around the sides of both end portions in the width direction of the first fixed electrode 550. In contrast, in the physical quantity sensor 800, the first dummy electrode 553 has a shape in which the first dummy electrode 553 wraps around only the side of the end portion on one side in the width direction of the first fixed electrode 550. Specifically, the first dummy electrode 553 is formed in an L-shape having the base portion 591a which is located on the −X-axis side of the first fixed electrode 550 and extends in the Y-axis direction, and the protrusion portion 592a which is located on the +Y-axis side of the first fixed electrode 550 and protrudes from the end portion on the +Y-axis side of the base portion 591b to the +X-axis side.

In the physical quantity sensor 800, similarly to the physical quantity sensors 300 and 700, it is possible to reduce the capacity offset, and thus the physical quantity sensor 800 can have high reliability.

Modified Example 5 of Physical Quantity Sensor

Figure 18:
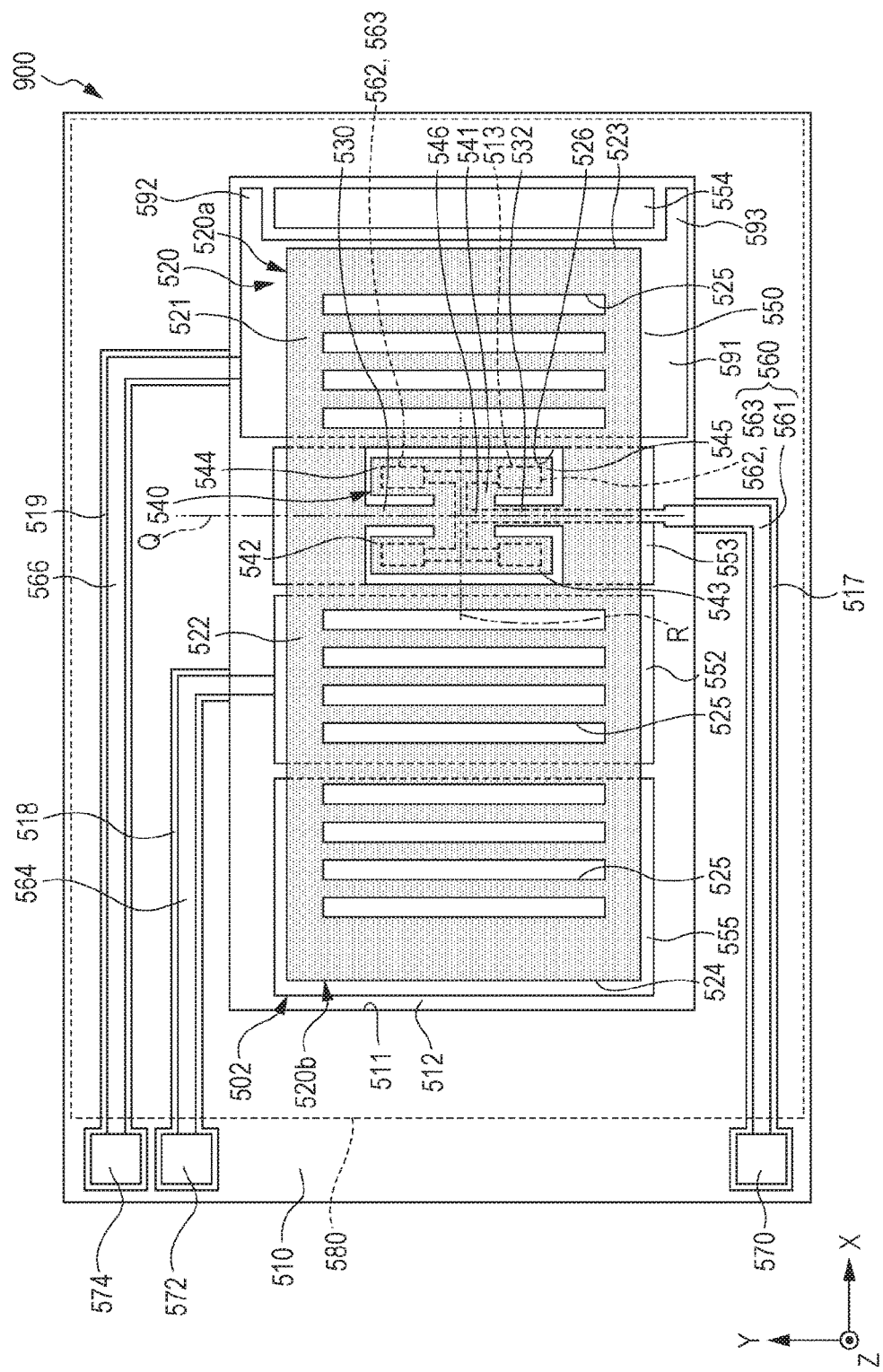
FIG. 18 is a plan view showing a physical quantity sensor according to Modified Example 5.

Next, a physical quantity sensor according to Modified Example 5 of the above-described physical quantity sensor will be described with reference to the drawing. FIG. 18 is a plan view showing a physical quantity sensor 900 according to Modified Example 5. In addition, for convenience, in FIG. 18, illustration is made to see through the lid body 580. Further, in FIG. 18, as three axes orthogonal to each other, the X-axis, the Y-axis, and the Z-axis are shown.

Hereinafter, in the physical quantity sensor 900 according to the modified example, members having the same function as the constituent members of the physical quantity sensor 300 of FIG. 13 are denoted by the same reference numerals and a detailed description thereof is omitted.

In the physical quantity sensor 300, as shown in FIG. 13, the second dummy electrode 554 has a shape in which the second dummy electrode 554 wraps around the sides of both end portions in the width direction of the first fixed electrode 550. In contrast, in the physical quantity sensor 900, as shown in FIG. 18, the first fixed electrode 550 has a shape in which the first fixed electrode 550 wraps around the sides of both end portions in the width direction of the second dummy electrode 554. Specifically, the first fixed electrode 550 is formed in a C-shape having a base portion 591 which is located on the −X-axis side of the second dummy electrode 554, a protrusion portion 592 which is located on the +Y-axis side of the second dummy electrode 554 and protrudes from an end portion on the +Y-axis side of the base portion 591 to the +X-axis side, and a protrusion portion 593 which is located on the −Y-axis side of the second dummy electrode 554 and protrudes in the +X-axis direction from an end portion on the −Y-axis side of the base portion 591. The protrusion portions 592 and 593 are respectively provided alongside (to face) the second dummy electrode 554 in the Y-axis direction and are disposed to face each other with the second dummy electrode 554 interposed therebetween.

In the physical quantity sensor 900, similarly to the physical quantity sensor 300, it is possible to reduce the capacity offset, and thus the physical quantity sensor 900 can have high reliability.

3. Electronic Equipment

Next, electronic equipment according to the invention will be described.

Figure 19:
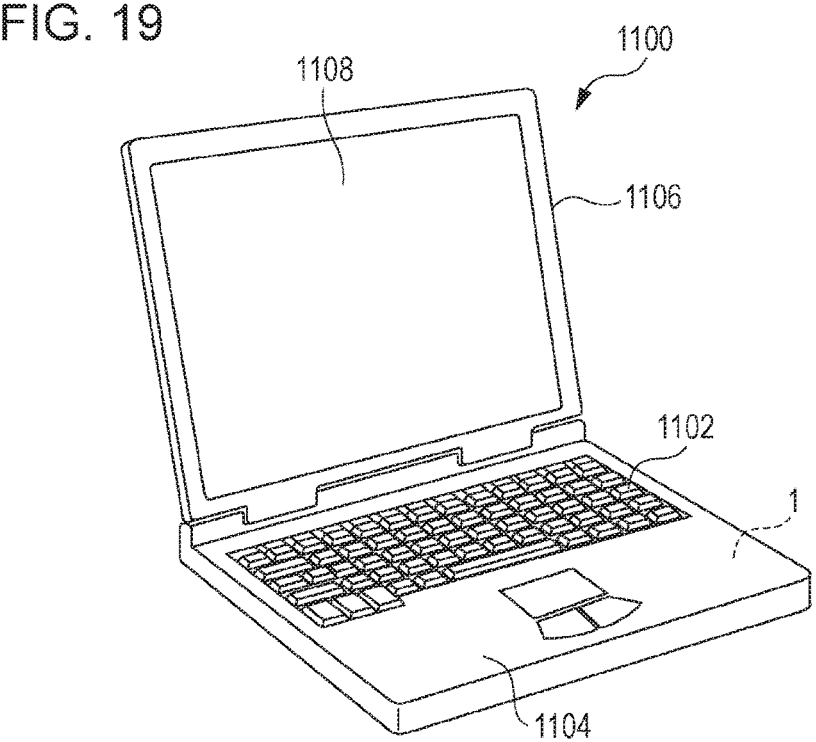
FIG. 19 is a perspective view showing the configuration of a mobile type (or a notebook type) personal computer with electronic equipment according to the invention applied thereto.

FIG. 19 is a perspective view showing the configuration of a mobile type (or a notebook type) personal computer with the electronic equipment according to the invention applied thereto.

In this drawing, a personal computer 1100 is configured to include a main body section 1104 provided with a keyboard 1102, and a display unit 1106 provided with a display section 1108, and the display unit 1106 is supported so as to be able to rotate with respect to the main body section 1104 through a hinge structure section. Any of the physical quantity sensors 1, 200, 300, 400, 600, 700, 800, and 900 which measure a physical quantity such as acceleration or angular velocity for measuring dropping or inclination of the personal computer 1100 is mounted on the personal computer 1100. Hereinafter, the physical quantity sensor 1 will be described as a representative. In this manner, the physical quantity sensor 1 described above is mounted, whereby it is possible to obtain the personal computer 1100 having high reliability.

Figure 20:
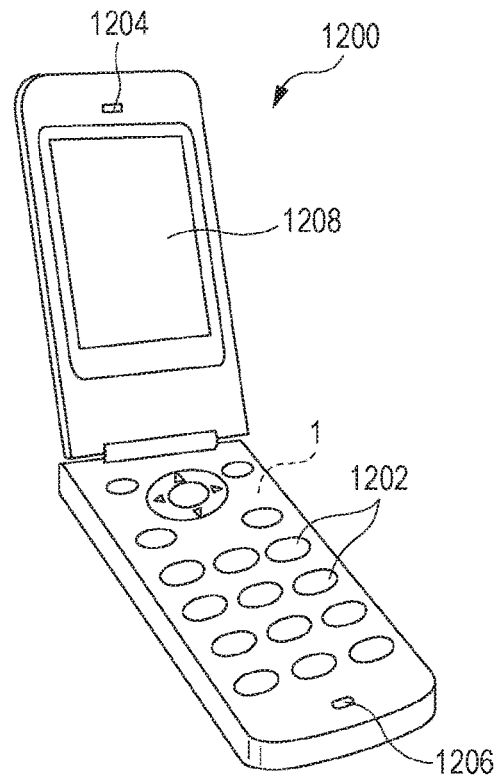
FIG. 20 is a perspective view showing the configuration of a mobile phone (also includes a PHS) with the electronic equipment according to the invention applied thereto.

FIG. 20 is a perspective view showing the configuration of a mobile phone (also includes a PHS) with the electronic equipment according to the invention applied thereto.

In this drawing, a mobile phone 1200 is provided with an antenna (not shown), a plurality of operation buttons 1202, an ear piece 1204, and a mouthpiece 1206, and a display section 1208 is disposed between the operation buttons 1202 and the ear piece 1204. The physical quantity sensor 1 which measures a physical quantity such as acceleration or angular velocity for measuring dropping or inclination of the mobile phone 1200 is mounted on the mobile phone 1200. In this manner, the physical quantity sensor 1 described above is mounted, whereby it is possible to obtain the mobile phone 1200 having high reliability.

Figure 21:
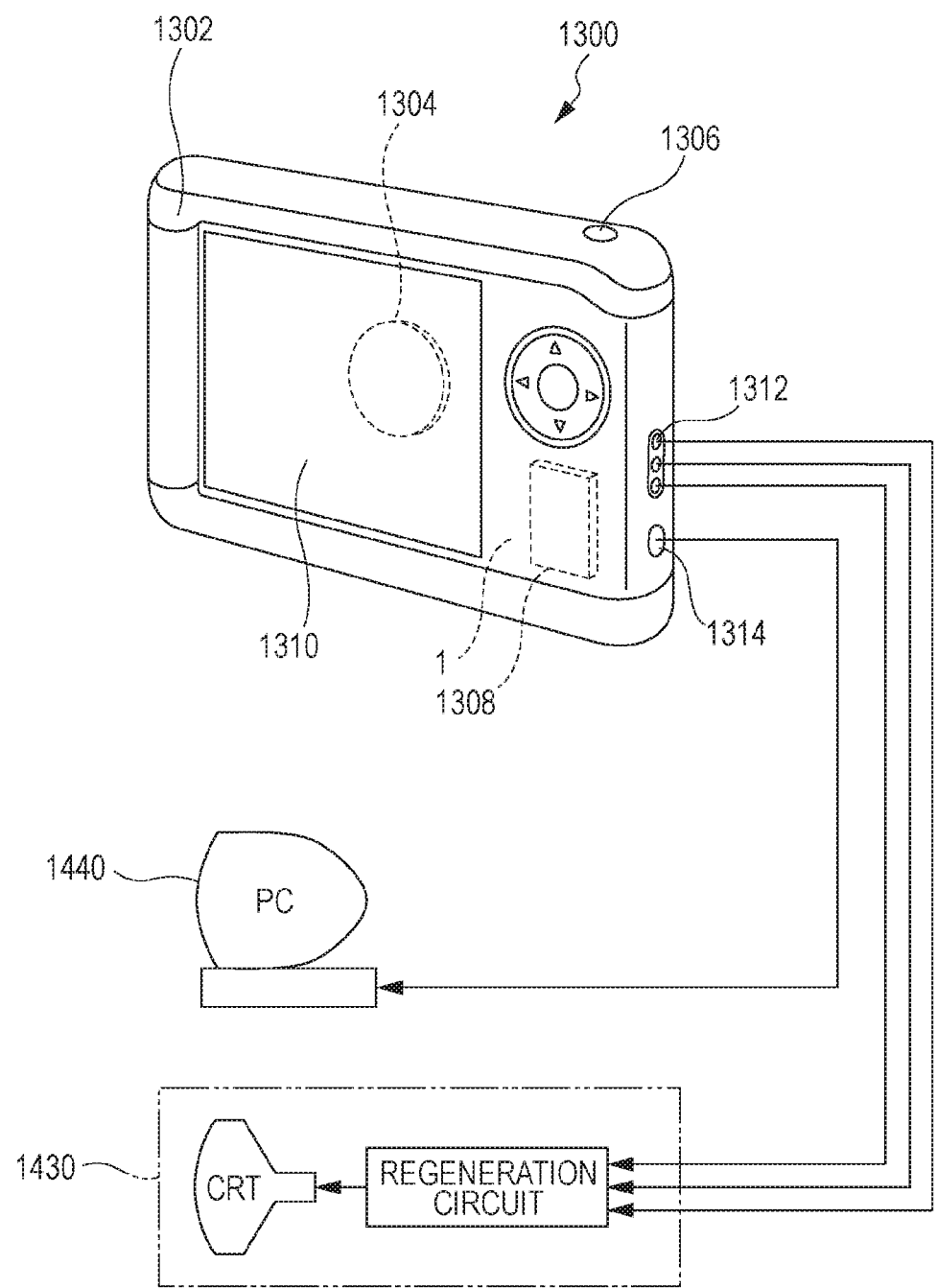
FIG. 21 is a perspective view showing the configuration of a digital still camera with the electronic equipment according to the invention applied thereto.

FIG. 21 is a perspective view showing the configuration of a digital still camera with the electronic equipment according to the invention applied thereto. In addition, in this drawing, connection with external equipment is also shown in a simplified manner.

Here, an ordinary camera exposes a silver halide photographic film to light through an optical image of a photographic subject, whereas a digital still camera 1300 produces an imaging signal (an image signal) by performing photoelectric conversion of an optical image of a photographic subject through an imaging element such as a charge coupled device (CCD).

A configuration is made in which a display section 1310 is provided on the back surface of a case (a body) 1302 in the digital still camera 1300 and display is performed based on the imaging signal by the CCD, and the display section 1310 functions as a finder which displays a photographic subject as an electronic image. Further, a light receiving unit 1304 which includes an optical lens (an imaging optical system), the CCD, or the like is provided on the front side (the back side in the drawing) of the case 1302.

If a photographer confirms a photographic subject image displayed on the display section and then presses a shutter button 1306, the imaging signal of the CCD at that point in time is transmitted to and stored in a memory 1308. Further, in the digital still camera 1300, a video signal output terminal 1312 and an input-output terminal for data communication 1314 are provided on the side surface of the case 1302. Then, as shown in the drawing, as necessary, a television monitor 1430 is connected to the video signal output terminal 1312 and a personal computer 1440 is connected to the input-output terminal for data communication 1314. In addition, a configuration is made in which the imaging signal stored in the memory 1308 is output to the television monitor 1430 or the personal computer 1440 by a predetermined operation. The physical quantity sensor 1 which measures a physical quantity such as acceleration or angular velocity for measuring dropping or inclination of the digital still camera 1300 is mounted on the digital still camera 1300. In this manner, the physical quantity sensor 1 described above is mounted, whereby it is possible to obtain the digital still camera 1300 having high reliability.

In addition, the electronic equipment according to the invention can be applied to, in addition to the personal computer (the mobile type personal computer) of FIG. 19, the mobile phone 1200 of FIG. 20, and the digital still camera 1300 of FIG. 21, for example, an ink jet type discharge apparatus (for example, an ink jet printer), a laptop type personal computer, a television, a video camera, a video tape recorder, a car navigation device, a pager, an electronic notebook (also including an electronic notebook with a communication function), an electronic dictionary, a desktop electronic calculator, electronic game equipment, a word processor, a workstation, a video phone, a security television monitor, electronic binoculars, a POS terminal, medical equipment (for example, an electronic thermometer, a sphygmomanometer, a blood glucose meter, an electrocardiogram measuring device, an ultrasonic diagnostic device, or an electronic endoscope), a fish finder, various measuring instruments, meters and gauges (for example, meters and gauges of a vehicle, an aircraft, or a ship), a flight simulator, or the like.

4. Moving Body

Next, a moving body according to the invention will be described.

Figure 22:
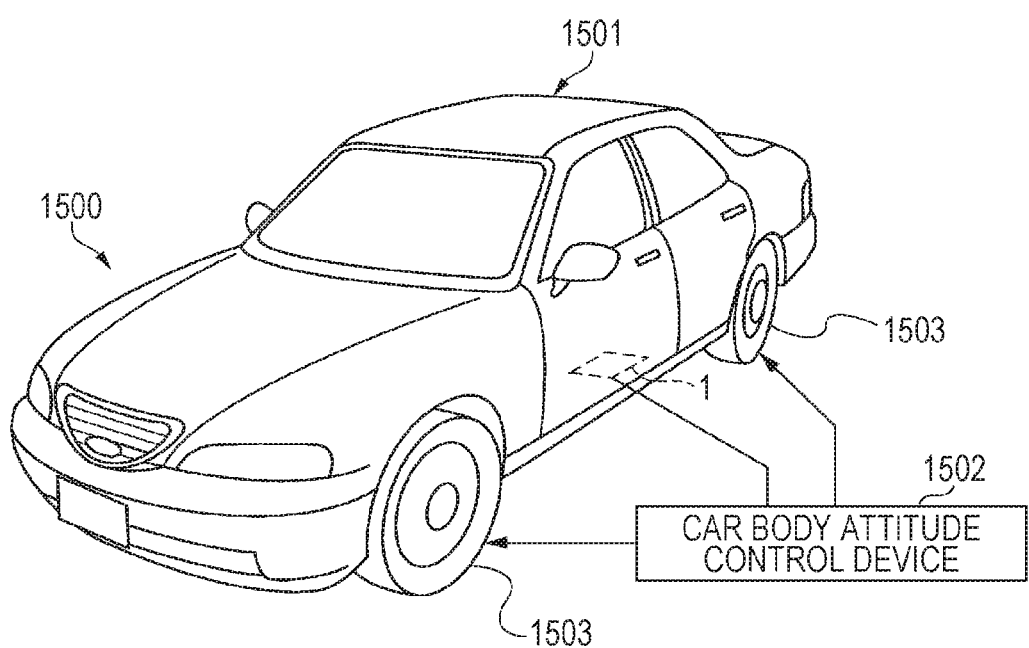
FIG. 22 is a perspective view showing an automobile with a moving body according to the invention applied thereto.

FIG. 22 is a perspective view showing an automobile with the moving body according to the invention applied thereto.

The physical quantity sensor 1 is built in an automobile 1500 and it is possible to detect the attitude of a car body 1501 by, for example, the physical quantity sensor 1. A detection signal of the physical quantity sensor 1 is supplied to a car body attitude control device 1502, and the car body attitude control device 1502 detects the attitude of the car body 1501 based on the signal and can control the hardness and softness of a suspension or control a brake of an individual wheel 1503 according to a detection result.

The physical quantity sensor, the physical quantity sensor device, the electronic equipment, and the moving body according to the invention have been described above based on the embodiments shown in the drawings. However, the invention is not limited thereto and the configuration of each section can be replaced with any configuration having the same function. Further, any other configuration may be added to the invention.

What is claimed is:

1. A physical quantity sensor having an X-axis, a Y-axis, and a Z-axis that are orthogonal to each other, the physical quantity sensor comprising:
    a substrate having a main surface, a first fixed electrode and a second fixed electrode being provided on the main surface, the first and second fixed electrodes being arranged along a direction from a positive side of the X-axis to a negative side of the X-axis;
    a movable member including a first mass and a second mass, the first and second masses facing the first and second fixed electrodes along the Z-axis, respectively, the first mass and the second mass being arranged along the X-axis;
    a support that is fixed to the substrate, the support being provided between the first mass and the second mass;
    a connection member connecting between the movable member and the support, the connection member extending along the Y-axis;
    a first dummy electrode that is provided on the main surface of the substrate, the first dummy electrode being located between the first fixed electrode and the second fixed electrode;
    a second dummy electrode that is provided on the main surface of the substrate, the second dummy electrode facing a first edge of the first fixed electrode, the first edge being located at an opposite side of the first dummy electrode; and
    a third dummy electrode that is provided on the main surface of the substrate, the third dummy electrode facing a second edge of the second fixed electrode in a direction along the X-axis, the second edge being located at an opposite side of the first dummy electrode,
    wherein the movable member is movable along the Z-axis with respect to the connection member as a rotation axis,
    the first, second, and third dummy electrodes are electrically insulated from the first and second fixed electrodes,
    the first, second, and third dummy electrodes are electrically connected to the movable member, a width of the second dummy electrode along the Y-axis is larger than a width of the first fixed electrode along the Y-axis in a plan view along the Z-axis, the second dummy electrode is configured with:
- a base extending along the Y-axis, the base having a first end and a second end that are opposite to each other along the Y-axis;
- a first projection projecting from the first end of the base toward the negative side of the X-axis; and
- a second projection projecting from the second end of the base toward the negative side of the X-axis, and a part of the first fixed electrode is located between the first projection and the second projection along the Y-axis in the plan view along the Z-axis.

2. The physical quantity sensor according to claim 1, wherein the movable member has a through hole passing through the movable member along the Z-axis in the plan view, and the support is located in the through hole in the plan view.

3. The physical quantity sensor according to claim 2, wherein the substrate has a convex on the main surface, and the convex is located between the first fixed electrode and the second fixed electrode in the plan view, and the support is fixed to the substrate via the convex.

4. The physical quantity sensor according to claim 3, wherein the support is configured with first and second supports, and the convex is configured with first and second convexes, and the first support is fixed to the first convex, and the second support is fixed to the second convex.

5. The physical quantity sensor according to claim 4, wherein each of the first and second masses has a through hole.

6. The physical quantity sensor according to claim 5, further comprising:
- a lid that is fixed to the substrate so as to form a cavity between the lid and the substrate, wherein the movable member is located in the cavity.

7. The physical quantity sensor according to claim 6, wherein the cavity is filled with an inert gas.

8. An electronic device comprising:
- the physical quantity sensor according to claim 1;
- a display; and
- a case that houses the physical quantity sensor and the display.

9. A movable object comprising:
- the physical quantity sensor according to claim 1; and
- a movable body that houses the physical quantity sensor.

10. A physical quantity sensor having an X-axis, a Y-axis, and a Z-axis that are orthogonal to each other, the physical quantity sensor comprising:
- a substrate having a main surface, a first fixed electrode and a second fixed electrode being provided on the main surface, the first and second fixed electrodes being arranged along a direction from a positive side of the X-axis to a negative side of the X-axis;
- a movable member including a first mass and a second mass, the first and second masses facing the first and second fixed electrodes along the Z-axis, respectively, the first mass and the second mass being arranged along the X-axis;
- a support that is fixed to the substrate, the support being provided between the first mass and the second mass;
- a connection member connecting between the movable member and the support, the connection member extending along the Y-axis;
- a first dummy electrode that is provided on the main surface of the substrate, the first dummy electrode being located between the first fixed electrode and the second fixed electrode;
- a second dummy electrode that is provided on the main surface of the substrate, the second dummy electrode facing a first edge of the first fixed electrode, the first edge being located at an opposite side of the first dummy electrode; and
- a third dummy electrode that is provided on the main surface of the substrate, the third dummy electrode facing a second edge of the second fixed electrode in a direction along the X-axis, the second edge being located at an opposite side of the first dummy electrode, wherein the movable member is movable along the Z-axis with respect to the connection member as a rotation axis, the first, second, and third dummy electrodes are electrically insulated from the first and second fixed electrodes, the first, second, and third dummy electrodes are electrically connected to the movable member, a width of the first dummy electrode along the Y-axis is larger than a width of the first fixed electrode along the Y-axis in a plan view along the Z-axis, the first dummy electrode is configured with:
- a base extending along the Y-axis, the base having a first end and a second end that are opposite to each other along the Y-axis;
- a first projection projecting from the first end of the base toward the positive side of the X-axis; and
- a second projection projecting from the second end of the base toward the positive side of the X-axis, and a part of the first fixed electrode is located between the first projection and the second projection along the Y-axis in the plan view along the Z-axis.

11. The physical quantity sensor according to claim 10, wherein the movable member has a through hole passing through the movable member along the Z-axis in the plan view, and the support is located in the through hole in the plan view.

12. The physical quantity sensor according to claim 11, wherein the substrate has a convex on the main surface, and the convex is located between the first fixed electrode and the second fixed electrode in the plan view, and the support is fixed to the substrate via the convex.

13. The physical quantity sensor according to claim 12, wherein the support is configured with first and second supports, and the convex is configured with first and second convexes, and the first support is fixed to the first convex, and the second support is fixed to the second convex.

14. The physical quantity sensor according to claim 13, wherein each of the first and second masses has a through hole.

15. The physical quantity sensor according to claim 14, further comprising:
- a lid that is fixed to the substrate so as to form a cavity between the lid and the substrate, wherein the movable member is located in the cavity.

16. A physical quantity sensor having an X-axis, a Y-axis, and a Z-axis that are orthogonal to each other, the physical quantity sensor comprising:
- a substrate having a main surface, a first fixed electrode and a second fixed electrode being provided on the main surface, the first and second fixed electrodes being arranged along a direction from a positive side of the X-axis to a negative side of the X-axis;

a movable member including a first mass and a second mass, the first and second masses facing the first and second fixed electrodes along the Z-axis, respectively, the first mass and the second mass being arranged along the X-axis;

a support that is fixed to the substrate, the support being provided between the first mass and the second mass;

a connection member connecting between the movable member and the support, the connection member extending along the Y-axis;

a first dummy electrode that is provided on the main surface of the substrate, the first dummy electrode being located between the first fixed electrode and the second fixed electrode;

a second dummy electrode that is provided on the main surface of the substrate, the second dummy electrode facing a first edge of the first fixed electrode, the first edge being located at an opposite side of the first dummy electrode; and a third dummy electrode that is provided on the main surface of the substrate, the third dummy electrode facing a second edge of the second fixed electrode in a direction along the X-axis, the second edge being located at an opposite side of the first dummy electrode, wherein the movable member is movable along the Z-axis with respect to the connection member as a rotation axis, the first, second, and third dummy electrodes are electrically insulated from the first and second fixed electrodes, the first, second, and third dummy electrodes are electrically connected to the movable member, a width of the first fixed electrode along the Y-axis is larger than a width of the second dummy electrode along the Y-axis in a plan view along the Z-axis, the first fixed electrode is configured with:
  a base extending along the Y-axis, the base having a first end and a second end that are opposite to each other along the Y-axis;
  a first projection projecting from the first end of the base toward the positive side of the X-axis; and
  a second projection projecting from the second end of the base toward the positive side of the X-axis, and a part of the second dummy electrode is located between the first projection and the second projection along the Y-axis in the plan view along the Z-axis.

17. The physical quantity sensor according to claim 16, wherein the movable member has a through hole passing through the movable member along the Z-axis in the plan view, and the support is located in the through hole in the plan view.

18. The physical quantity sensor according to claim 17, wherein the substrate has a convex on the main surface, and the convex is located between the first fixed electrode and the second fixed electrode in the plan view, and the support is fixed to the substrate via the convex.

19. The physical quantity sensor according to claim 18, wherein the support is configured with first and second supports, and the convex is configured with first and second convexes, and the first support is fixed to the first convex, and the second support is fixed to the second convex.

20. The physical quantity sensor according to claim 19, wherein each of the first and second masses has a through hole.

* * * * *